(12) United States Patent
Moon et al.

(10) Patent No.: US 11,569,500 B2
(45) Date of Patent: Jan. 31, 2023

(54) POROUS SILICON COMPOSITE CLUSTER STRUCTURE, METHOD OF PREPARING THE SAME, CARBON COMPOSITE USING THE SAME, AND ELECTRODE, LITHIUM BATTERY, AND DEVICE EACH INCLUDING THE SAME

(71) Applicants: Samsung Electronics Co., Ltd., Suwon-si (KR); Samsung SDI Co., Ltd., Yongin-si (KR)

(72) Inventors: Jongseok Moon, Suwon-si (KR); Mijong Kim, Suwon-si (KR); Sewon Kim, Suwon-si (KR); Kyueun Shim, Daegu (KR); Sungsoo Han, Hwaseong-si (KR); Inhyuk Son, Yongin-si (KR); Jumyeung Lee, Suwon-si (KR)

(73) Assignee: SAMSUNG ELECTRONICS CO., LTD., Gyeonggi-Do (KR)

(*) Notice: Subject to any disclaimer, the term of this patent is extended or adjusted under 35 U.S.C. 154(b) by 141 days.

(21) Appl. No.: 17/189,837

(22) Filed: Mar. 2, 2021

(65) Prior Publication Data
US 2021/0202938 A1    Jul. 1, 2021

Related U.S. Application Data

(63) Continuation of application No. 15/816,095, filed on Nov. 17, 2017, now Pat. No. 10,978,701.

(30) Foreign Application Priority Data

Nov. 18, 2016  (KR) .................. 10-2016-0154454
Nov. 16, 2017  (KR) .................. 10-2017-0153319

(51) Int. Cl.
*H01M 4/38* (2006.01)
*H01M 4/1393* (2010.01)
(Continued)

(52) U.S. Cl.
CPC ............ *H01M 4/386* (2013.01); *H01G 11/24* (2013.01); *H01G 11/38* (2013.01); *H01G 11/42* (2013.01);
(Continued)

(58) Field of Classification Search
CPC ...... H01M 4/386; H01M 4/04; H01M 4/0471; H01M 4/134; H01M 4/1393;
(Continued)

(56) References Cited

U.S. PATENT DOCUMENTS

| 6,911,767 B2 | 6/2005 | Takai |
| 6,976,897 B2 | 12/2005 | Choi et al. |

(Continued)

FOREIGN PATENT DOCUMENTS

| CN | 103022453 A | 4/2013 |
| CN | 103682359 A | 3/2014 |

(Continued)

OTHER PUBLICATIONS

Son et al, "Graphene Coating of Silicon Nanoparticles with CO2-Enhanced Chemical Vapor Deposition", Materials Views, small-journal 12, No. 5, 2016, pp. 658-667.

(Continued)

*Primary Examiner* — Daniel C. McCracken
(74) *Attorney, Agent, or Firm* — Cantor Colburn LLP

(57) ABSTRACT

A porous silicon composite including: a porous silicon composite cluster comprising a porous silicon composite secondary particle and a second carbon flake on at least one surface of the porous silicon composite secondary particle; and a carbonaceous layer on the porous silicon composite cluster, the carbonaceous layer comprising amorphous carbon, wherein the porous silicon composite secondary particle comprises an aggregate of two or more silicon primary particles, the two or more silicon primary particles comprise (Continued)

silicon, a silicon suboxide of the formula $SiO_x$, wherein $0<x<2$ on a surface of the silicon, and a first carbon flake on at least one surface of the silicon suboxide, the silicon suboxide is in a form of a film, a matrix, or a combination thereof, and the first carbon flake and the second carbon flake are each independently present in a form of a film, particles, a matrix, or a combination thereof. Also a method of preparing the porous silicon composite, a carbon composite, an electrode, and a device, each including the porous silicon composite, and a lithium battery including the electrode.

43 Claims, 28 Drawing Sheets
(4 of 28 Drawing Sheet(s) Filed in Color)

(51) Int. Cl.

| | |
|---|---|
| H01M 4/134 | (2010.01) |
| H01M 4/1395 | (2010.01) |
| H01G 11/24 | (2013.01) |
| H01M 4/36 | (2006.01) |
| H01G 11/42 | (2013.01) |
| H01G 11/50 | (2013.01) |
| H01G 11/38 | (2013.01) |
| H01M 4/04 | (2006.01) |
| H01M 4/62 | (2006.01) |
| H01M 10/052 | (2010.01) |
| H01M 4/02 | (2006.01) |

(52) U.S. Cl.
CPC ............ *H01G 11/50* (2013.01); *H01M 4/04* (2013.01); *H01M 4/0471* (2013.01); *H01M 4/134* (2013.01); *H01M 4/1393* (2013.01); *H01M 4/1395* (2013.01); *H01M 4/362* (2013.01); *H01M 4/364* (2013.01); *H01M 4/366* (2013.01); *H01M 4/625* (2013.01); *H01M 10/052* (2013.01); *H01M 2004/021* (2013.01); *H01M 2004/027* (2013.01); *Y02E 60/13* (2013.01)

(58) Field of Classification Search
CPC .... H01M 4/1395; H01M 4/362; H01M 4/364; H01M 4/366; H01M 4/625; H01M 10/052; H01M 2004/021; H01M 2004/027; H01M 4/485; H01M 4/628; H01M 10/0525; H01M 4/133; H01M 4/587; H01G 11/24; H01G 11/38; H01G 11/42; H01G 11/50; Y02E 60/13; Y02E 60/10; B82Y 30/00; B82Y 40/00; G01N 27/308; G01N 27/327; H01L 35/22; H01L 35/14; C01B 33/02; C01B 32/182; C01B 33/12; C01P 2004/20; C01P 2004/50; C01P 2004/61; C01P 2004/64; C01P 2004/80; C01P 2006/12; H01J 2201/30453

See application file for complete search history.

(56) References Cited

U.S. PATENT DOCUMENTS

| | | |
|---|---|---|
| 7,009,331 B2 | 3/2006 | Sheu et al. |
| 7,816,031 B2 | 10/2010 | Cui et al. |
| 7,939,218 B2 | 5/2011 | Niu |
| 8,241,793 B2 | 8/2012 | Zhamu et al. |
| 8,367,244 B2 | 2/2013 | Ramasubramanian et al. |
| 8,753,545 B2 | 6/2014 | Obrovac et al. |
| 8,999,583 B2 | 4/2015 | Hirose et al. |
| 9,070,942 B2 | 6/2015 | Liu et al. |
| 9,325,028 B2 | 4/2016 | Kwon et al. |
| 9,331,338 B2 | 5/2016 | Hwang et al. |
| 9,444,085 B2 | 9/2016 | Kwon et al. |
| 9,536,735 B2 | 1/2017 | Son et al. |
| 9,548,490 B2 | 1/2017 | Ku et al. |
| 9,564,631 B2 | 2/2017 | Kim et al. |
| 9,972,833 B2 | 5/2018 | Jung et al. |
| 10,978,701 B2 * | 4/2021 | Moon ............... H01M 4/625 |
| 2006/0066217 A1 | 3/2006 | Son |
| 2006/0134516 A1 | 6/2006 | Im et al. |
| 2008/0160409 A1 | 7/2008 | Ishida et al. |
| 2008/0187838 A1 | 8/2008 | Le |
| 2008/0261116 A1 | 10/2008 | Burton et al. |
| 2009/0057649 A1 | 3/2009 | Sutter et al. |
| 2010/0081057 A1 | 4/2010 | Liu et al. |
| 2010/0176337 A1 | 7/2010 | Zhamu et al. |
| 2010/0193731 A1 | 8/2010 | Lee et al. |
| 2010/0273058 A1 | 10/2010 | Lee et al. |
| 2010/0288077 A1 | 11/2010 | Le |
| 2010/0297502 A1 | 11/2010 | Zhu et al. |
| 2010/0330421 A1 | 12/2010 | Cui et al. |
| 2011/0159368 A1 | 6/2011 | Hirose et al. |
| 2011/0183169 A1 | 7/2011 | Bhardwaj et al. |
| 2012/0021250 A1 | 1/2012 | Lee et al. |
| 2012/0064409 A1 | 3/2012 | Zhamu et al. |
| 2012/0121977 A1 | 5/2012 | Xu et al. |
| 2012/0244428 A1 | 9/2012 | Park et al. |
| 2013/0040201 A1 | 2/2013 | Manthiram et al. |
| 2013/0045385 A1 | 2/2013 | Kim et al. |
| 2013/0052537 A1 | 2/2013 | Takeuchi et al. |
| 2013/0083496 A1 | 4/2013 | Franklin et al. |
| 2013/0108907 A1 | 5/2013 | Bhardwaj et al. |
| 2013/0130115 A1 | 5/2013 | Park et al. |
| 2013/0134361 A1 | 5/2013 | Lee et al. |
| 2013/0149605 A1 | 6/2013 | Kakehata et al. |
| 2013/0209881 A1 * | 8/2013 | Do ............... H01M 4/386 |
| | | 429/231.9 |
| 2013/0273433 A1 | 10/2013 | Jouanneau-Si Larbi et al. |
| 2014/0255781 A1 | 9/2014 | Son et al. |
| 2014/0255785 A1 | 9/2014 | Do et al. |
| 2014/0287315 A1 | 9/2014 | Troegel et al. |
| 2014/0302385 A1 | 10/2014 | Choi et al. |
| 2014/0302395 A1 | 10/2014 | Fukuoka et al. |
| 2014/0315086 A1 | 10/2014 | Put et al. |
| 2014/0370387 A1 | 12/2014 | Anguchamy et al. |
| 2015/0072204 A1 | 3/2015 | Kwon et al. |
| 2015/0093648 A1 | 4/2015 | Son et al. |
| 2015/0380728 A1 | 12/2015 | Son et al. |
| 2016/0006024 A1 | 1/2016 | Xiao et al. |
| 2016/0013481 A1 | 1/2016 | Jeong et al. |
| 2016/0093879 A1 | 3/2016 | Song et al. |
| 2016/0256873 A1 | 9/2016 | Do et al. |
| 2016/0344020 A1 | 11/2016 | Tzeng et al. |
| 2016/0346769 A1 | 12/2016 | Kim et al. |
| 2016/0365573 A1 | 12/2016 | Li et al. |
| 2017/0047584 A1 | 2/2017 | Hwang et al. |
| 2017/0317352 A1 | 11/2017 | Lee et al. |
| 2017/0324097 A1 | 11/2017 | Lee et al. |
| 2017/0358797 A1 | 12/2017 | Son et al. |
| 2018/0040882 A1 | 2/2018 | Kim et al. |
| 2018/0040898 A1 | 2/2018 | Lee et al. |
| 2018/0083272 A1 | 3/2018 | Son et al. |
| 2018/0090802 A1 | 3/2018 | Kwon et al. |
| 2018/0115006 A1 | 4/2018 | Lee et al. |
| 2018/0145316 A1 | 5/2018 | Moon et al. |
| 2018/0307084 A1 | 10/2018 | Lee et al. |

FOREIGN PATENT DOCUMENTS

| | | |
|---|---|---|
| CN | 103730644 A | 4/2014 |
| CN | 103857623 A | 6/2014 |
| EP | 2768050 A1 | 8/2014 |
| EP | 2854204 A1 | 4/2015 |
| JP | 2007123255 A | 5/2007 |
| JP | 2011233497 A | 11/2011 |
| JP | 2013-258032 A | 12/2013 |
| KR | 1020070026699 A | 3/2007 |
| KR | 1020110039568 A | 4/2011 |

(56) References Cited

FOREIGN PATENT DOCUMENTS

| KR | 1020110124728 A | 11/2011 |
|---|---|---|
| KR | 1020120027369 A | 3/2012 |
| KR | 1020130004536 A | 1/2013 |
| KR | 1020130005102 A | 1/2013 |
| KR | 1020130016727 A | 2/2013 |
| KR | 1020130033733 A | 4/2013 |
| KR | 1020130094366 A | 8/2013 |
| KR | 1020140035689 A | 3/2014 |
| KR | 1020140036495 A | 3/2014 |
| KR | 101396521 B1 | 5/2014 |
| KR | 1020140061955 A | 5/2014 |
| KR | 1020140077622 A | 6/2014 |
| KR | 1020140110703 A | 9/2014 |
| KR | 1020140111548 A | 9/2014 |
| KR | 1020140121096 A | 10/2014 |
| KR | 1020150015086 A | 2/2015 |
| KR | 1020150039555 A | 4/2015 |
| KR | 1020150063620 A | 6/2015 |
| KR | 1020150128592 A | 11/2015 |
| KR | 1020150141924 A | 12/2015 |
| KR | 1020160008041 A | 1/2016 |
| KR | 1020160085834 A | 7/2016 |
| KR | 1020170018350 A | 2/2017 |
| KR | 1020170069042 A | 6/2017 |
| KR | 101772659 B1 | 8/2017 |
| KR | 101818813 B1 | 1/2018 |
| KR | 1020180031566 A | 3/2018 |
| KR | 1020180031585 A | 3/2018 |
| KR | 1020180119728 A | 11/2018 |
| KR | 101955531 B1 | 2/2019 |

OTHER PUBLICATIONS

Li et al., "Encapsulated within graphene shell silicon nanoparticles anchored on vertically aligned graphene trees as lithium ion battery anodes", Nano Energy, 5, 2014, 105-115.
Chinese Office Action for Chinese Patent Application No. 201711159045.3 dated Jan. 29, 2022.
Choi et al., "Fading machanisms of carbon-coated and disproportionated Si/SiOx nagative electrode (Si/SiOx/C) in Li-ion secondary batteries: Dynamics and component analysis by TEM", Electrochimica Acta 85, 2012, 369-376.
Extended European Search Report for European Patent Application No. 14186903.2 dated Feb. 25, 2015.
Final OA, dated Aug. 15, 2017, U.S. Appl. No. 14/499,624.
H. Medina, et al., "Metal-Free Growth of Nanographene on Silicon Oxides for Transparent Conducting Applications," Advanced Functional Materials 2012, 22, pp. 2123-2128.
Hu et al., "Superior Storage Performance of a Si@SiOx/C Nanocomposite as Anode Material for Lithium-Ion Batteries", Angew. Chem. Int. Ed., vol. 47, 2008, pp. 1645-1649.
Yan Yao, "Interconnected Silicon Hollow Nanospheres for Lithium-Ion Battery Anodes with Long Cycle Life," Nano Letters 2011, 11, pp. 2949-2954.
Hui Wu, et al., "Stable cycling of double-walled silicon nanotube battery anodes through solid-electrolyte interphase control," Nature Nanotechnology, vol. 7, May 2012, pp. 310-315.
Hyung Mo Jeong, et al., "Silicon@porous nitrogen-doped carbon spheres through a bottom-up approach are highly robust lithium-ion battery anodes," RSC Advances, 2012, 2, pp. 4311-4317.
J. Luo et al., Crumpled Graphene-Encapsulated Si Nanoparticles for Lithium Ion Battery Anodes, Journal of Physical Chemistry Letters, vol. 3, Issue 13, Jul. 5, 2012, pp. 824-1829.
Jianyi Chen, et al., "Oxygen-Aided Synthesis of Polycrystalline Graphene on Silicon Dioxide Substrates," Journal of the American Chemical Society 2011, 133, pp. 17548-17551.
Korean Office Action for Korean Patent Application No. 1020140119376 dated Sep. 2, 2015.
K-S Kim et al., Chemical Vapor Deposition-Grown Graphene: The thinnest solid lubricant, ACS Nano, vol. 5, Issue 6, Jun. 2011, pp. 5107-5114.
Li et al., "Flexible graphene-based lithium ion batteries with ultra-fast charge and discharge rates", PNAS, vol. 109, No. 43, Oct. 23, 2012, 17360-17365.
Liu et al., "A Yolk-Shell Design for Stabilized and Scalable Li-Ion Battery Alloy Anodes", NANO Letters, American Chemical Society, 2012. p. 1-7.
Final Office Action dated Nov. 25, 2019 in U.S. Appl. No. 15/928,397.
Non-Final Office Action, dated Apr. 7, 2017, U.S. Appl. No. 14/499,624.
Notification of European publication number for European Patent Application No. 14186903.2 dated Mar. 4, 2015.
S. Kataria et al., Raman imaging on high-quality graphene grown by hot-filament chemical vapor deposition, Journal of Raman Spectroscopy, vol. 43, Aug. 1, 2012, pp. 1864-1867.
Shao-long Wu, et al., "Tunable synthesis of carbon nanosheet/silicon nanowire hybrids for field emission applications," Diamond & Related Materials 26 (2012) pp. 83-88.
Sim et al., Critical Thickness of SiO2 Coating Layer on Core@Shell Bulk@ Nanowire Si Anode Materials for Li-Ion Batteries, Advanced Materials, 2013, 25, 4498-4503.
Son et al., Silicon carbide-free graphene grown on silicon for lithium-ion battery with high volumetric energy density, Nature Comm, 2015, 6, 7393 2015, pp. 1-8.
Yuanhua Zhu, et al., "Directing Silicon-Graphene Self-Assembly as a Core/Shell Anode for High-Performance Lithium-Ion Batteries," Langmuir 2013, 29, pp. 744-749.
Tae Park et al., "Controlled growth of core-shell Si—SiOx and amorphous SiO2 Nanowires directly from NiO/Si", Nanotechnology, 145, 2004 S365-S370.
Wu et al., "Graphene/metal oxide composite electrode materials for energy storage", Nano Energy, 1, 2012, 107-131.
Non-Final Office Action dated May 15, 19 in U.S. Appl. No. 15/928,397.

* cited by examiner

US 11,569,500 B2

POROUS SILICON COMPOSITE CLUSTER STRUCTURE, METHOD OF PREPARING THE SAME, CARBON COMPOSITE USING THE SAME, AND ELECTRODE, LITHIUM BATTERY, AND DEVICE EACH INCLUDING THE SAME

CROSS-REFERENCE TO RELATED APPLICATION

This application is a continuation of U.S. patent application Ser. No. 15/816,095, filed on Nov. 17, 2017, which claims priority to and the benefit of Korean Patent Application Nos. 10-2016-0154454, filed on Nov. 18, 2016, and 10-2017-0153319, filed on Nov. 16, 2017, in the Korean Intellectual Property Office, and all the benefits accruing therefrom under 35 U.S.C. § 119, the contents of which are incorporated herein in their entirety by reference.

BACKGROUND

1. Field

The present disclosure relates to a porous silicon composite cluster structure, a method of preparing the same, a carbon composite using the porous silicon composite, and an electrode, a lithium battery, and a device, each including the porous silicon composite cluster structure.

2. Description of the Related Art

Silicon, among other negative active materials for a lithium ion battery, may have a high theoretical capacity of 4,200 mAh/g and a low cost, and thus has been studied for use as a negative electrode material. However, silicon may undergo a large volume expansion as a $Li_{4.4}Si$ alloy is generated during discharge of a battery, and can produce an electrically isolated active material in the electrode. Furthermore, an increased specific surface area of the silicon may accelerate an electrolyte decomposition reaction. A structure that more effectively suppresses the volume expansion of the silicon and a pulverization phenomenon of the silicon during the volume expansion of the silicon would be desirable. Thus, there remains a need for improved silicon electrode material.

SUMMARY

Provided are a porous silicon composite cluster structure and a method of preparing the same.

Provided is a carbon composite including the porous silicon composite cluster structure and a carbonaceous material.

Provided is a lithium battery including an electrode, the electrode including the porous silicon composite cluster structure or including a carbon composite including the porous silicon composite cluster structure and a carbonaceous material.

Provided is a device including the porous silicon composite cluster structure or including a carbon composite including the porous silicon composite cluster structure and a carbonaceous material. The device may be a field emission device, a biosensor, a semiconductor device, or a thermoelectric device.

Additional aspects will be set forth in part in the description which follows and, in part, will be apparent from the description, or may be learned by practice of the presented embodiments.

According to an aspect, a porous silicon composite cluster includes: a porous silicon composite cluster comprising a porous silicon composite secondary particle and a second carbon flake on at least one surface of the porous silicon composite secondary particle; and a carbonaceous layer on the porous silicon composite cluster, the carbonaceous layer comprising amorphous carbon, wherein the porous silicon composite secondary particle comprises an aggregate of two or more silicon primary particles, the two or more silicon primary particles comprise silicon, a silicon suboxide of the formula $SiO_x$, wherein $0<x<2$ on a surface of the silicon, and a first carbon flake on at least one surface of the silicon suboxide, the silicon suboxide is in a form of a film, a matrix, or a combination thereof, and the first carbon flake and the second carbon flake are each independently present in a form of a film, particles, a matrix, or a combination thereof.

According to another aspect, a method of preparing the porous silicon composite includes: contacting a dispersing agent, a solvent, and a particle including silicon and a silicon suboxide of the formula $SiO_x$ wherein $0<x<2$ on the silicon to obtain a porous silicon cluster; thermally treating a combination of a carbon source gas and the porous silicon cluster to obtain the porous silicon composite secondary particle; and mixing a composition including the porous silicon composite secondary particle (porous silicon composite cluster), amorphous carbon, and a solvent in a dry manner to prepare the porous silicon composite cluster structure.

According to another aspect, a carbon composite includes the porous silicon composite and a carbonaceous material.

According to another aspect, an electrode includes the porous silicon composite cluster structure or the carbon composite.

According to another aspect, a lithium battery includes the electrode.

According to another aspect, a device includes the porous silicon composite cluster structure or the carbon composite.

According to another aspect, a porous silicon composite cluster structure includes: a porous silicon composite cluster includes: a core including a porous silicon composite secondary particle; and a shell disposed on the core, the shell including a second carbon flake, and a carbonaceous layer on the porous silicon composite cluster, the carbonaceous layer comprising amorphous carbon, wherein the porous silicon composite secondary particle includes an aggregate of two or more silicon composite primary particles, and the silicon composite primary particles include: at least one silicon oxide selected from i) a silicon suboxide ($SiO_x$, wherein $0<x<2$), and ii) a thermal treatment product of a silicon suboxide ($SiO_x$, wherein $0<x<2$); and a first carbon flake disposed on the at least one silicon suboxide. the silicon suboxide is in a form of a film, a matrix, or a combination thereof, and the first carbon flake and the second carbon flake are each independently present in a form of a film, particles, a matrix, or a combination thereof.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

These and/or other aspects will become apparent and more readily appreciated from the following description of the embodiments, taken in conjunction with the accompanying drawings in which:

FIG. 4E is an SEM image of a structure of Comparative Example 4a;

DETAILED DESCRIPTION

Figure 1A:
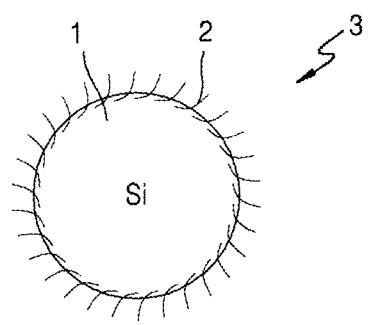
FIG. 1A illustrates an embodiment of a silicon primary particle.

Reference will now be made in detail to embodiments with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third," etc. may be used herein to describe various elements, components, regions, layers, and/or sections, these elements, components, regions, layers and/or sections should not be limited by these terms. These terms are only used to distinguish one element, component, region, layer, or section from another element, component, region, layer or section. Thus, "a first element," "component," "region," "layer," or "section" discussed below could be termed a second element, component, region, layer, or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "At least one" is not to be construed as limiting "a" or "an." "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10% or 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

The C rate is a discharge rate of a cell, and is obtained by dividing a total capacity of the cell by a total discharge period of time of 1 hour, e.g., a C rate for a battery having a discharge capacity of 1.6 ampere-hours would be 1.6 amperes. According to an aspect of the present disclosure, a porous silicon composite cluster structure comprises: a porous silicon composite cluster comprising a porous silicon composite secondary particle and a second carbon flake on at least one surface of the porous silicon composite secondary particle; and a carbonaceous layer on the porous silicon composite cluster, the carbonaceous layer comprising amorphous carbon, wherein the porous silicon composite secondary particle comprises an aggregate of two or more silicon primary particles, the two or more silicon primary particles comprise silicon, a silicon suboxide of the formula $SiO_x$, wherein $0<x<2$ on a surface of the silicon, and a first carbon flake on at least one surface of the silicon suboxide, the silicon suboxide is in a form of a film, a matrix, or a combination thereof, and the first carbon flake and the second carbon flake are each independently present in a form of a film, particles, a matrix, or a combination thereof. According to an embodiment, the silicon suboxide is embedded in the first flake in a form of a matrix.

In an aspect, the porous silicon composite cluster structure comprises: a porous silicon composite cluster includes: a core including a porous silicon composite secondary particle; and a shell disposed on the core, the shell including a second carbon flake, and a carbonaceous layer on the porous silicon composite cluster, the carbonaceous layer comprising amorphous carbon, wherein the porous silicon composite secondary particle includes an aggregate of two or more silicon composite primary particles, and the silicon composite primary particles include: at least one silicon oxide (silicon oxide A) selected from i) a silicon suboxide ($SiO_x$, wherein $0<x<2$), and ii) a thermal treatment product of a silicon suboxide ($SiO_x$, wherein $0<x<2$); and a first carbon flake disposed on the at least one silicon suboxide. the silicon suboxide is in a form of a film, a matrix, or a combination thereof, and the first carbon flake and the second carbon flake are each independently present in a form of a film, particles, a matrix, or a combination thereof.

In another aspect, the carbonaceous layer of the porous silicon composite cluster structure may be omitted.

According to an embodiment, the silicon oxide A is embedded in the first flake in a form of a matrix.

According to an embodiment, the first carbon flake may be disposed directly on the silicon suboxide, and the second carbon flake may be disposed directly on the porous silicon composite secondary particle. Also, the first carbon flake may completely cover the surface of the silicon suboxide, or may partially cover the surface of the silicon suboxide, e.g., cover about 10% to about 99%, about 20% to about 95%, or cover about 40% to about 90% of the surface of the silicon suboxide.

According to an embodiment, the first carbon flake may be directly grown on the surface of the silicon suboxide, and the second carbon flake may be directly grown on the surface of the porous silicon secondary particle. Also, the second carbon flake may completely cover the surface of the porous silicon secondary particle, or may partially cover the surface of the porous silicon secondary particle, e.g., cover about 10% to about 99%, about 20% to about 95%, or cover about 40% to about 90% of the surface of the porous silicon secondary particle.

According to an embodiment, the second carbon flake may be directly grown on the surface of the silicon suboxide of the porous silicon composite secondary particle.

In an embodiment, the first carbon flake is directly on the surface of the silicon suboxide, and the second carbon flake is directly on the surface of the porous silicon secondary particle.

According to an embodiment, the porous silicon composite may include the porous silicon composite secondary particle in a core thereof, and the second carbon flake in a shell, which is disposed on and surrounds the core. Due to the presence of carbon in the form of flakes in the shell, the silicon may easily contact the carbon flakes when volume expansion of the porous silicon composite occurs. The core of the porous silicon composite cluster structure may include pores, which may serve as a buffer space when the composite secondary particle expands. The porous silicon composite cluster structure may have a carbonaceous layer, which includes an amorphous carbon, e.g., a high-density amorphous carbon, as a protective shell to suppress permeation of a liquid electrolyte. The carbonaceous layer may protect the core of the composite from being physically suppressed. The carbonaceous layer may include amorphous carbon to facilitate migration of lithium ions during charging and discharging. Also, the carbonaceous layer may completely cover the surface of the porous silicon secondary particle, or may partially cover the surface of the porous silicon secondary particle, e.g., cover about 10% to about 99%, about 20% to about 95%, or cover about 40% to about 90% of the surface of the porous silicon secondary particle. In the pores of the porous silicon secondary particle are not filled with the amorphous carbon in the carbonaceous layer.

Figure 1B:
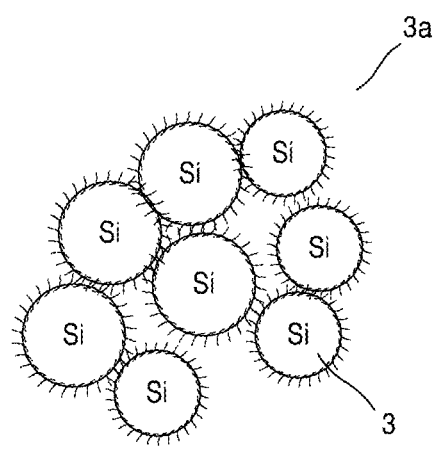
FIG. 1B is a schematic view illustrating an embodiment of a porous silicon secondary particle.
Figure 1C:
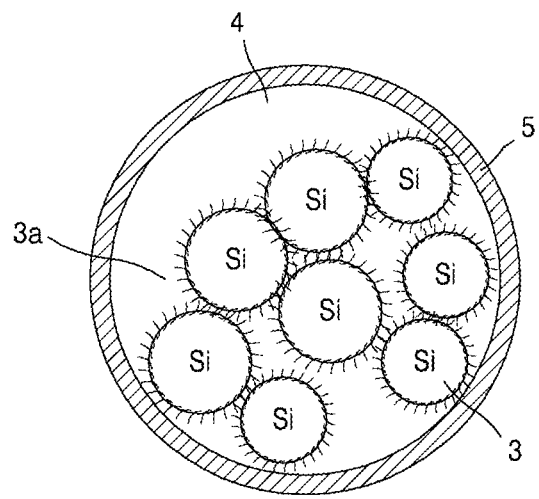
FIG. 1C is a schematic view of an embodiment of a porous silicon composite cluster structure.

FIG. 1A is a schematic view illustrating a structure of an embodiment of a silicon primary particle, which constitutes a porous silicon composite secondary particle according to an embodiment. FIG. 1B is a schematic view of embodiment of the porous silicon secondary particle (e.g., a porous silicon composite cluster) according to an embodiment, which is an aggregate of silicon primary particles, each being the silicon composite primary particle illustrated in FIG. 1A. FIG. 1C is a schematic view illustrating a structure of an embodiment of a porous silicon composite according to an embodiment.

Referring to FIG. 1A, a silicon primary particle 3 according to an embodiment may include: silicon 1; a silicon suboxide of the formula $SiO_x$, wherein $0<x<2$, on the silicon 1, and a first carbon flake 2 on the silicon suboxide. In FIGS. 1A to 1C, the silicon suboxide is not shown for convenience of illustration.

Referring to FIG. 1B, a porous silicon secondary particle according to an embodiment may include a plurality of silicon primary particles 3a in the form of a cluster, which is an aggregate of the plurality of silicon primary particles, each being the silicon primary particle 3 illustrated in FIG. 1A. Referring to FIG. 1C, a porous silicon composite according to an embodiment may comprise the cluster of silicon primary particles 3a illustrated in FIG. 1B, as a core, and a carbonaceous layer 5 as a shell on the core, the carbonaceous layer 5 including amorphous carbon. As used herein, the term "porous silicon composite cluster" may have substantially the same meaning as the term "porous silicon composite secondary particle."

Figure 1D:
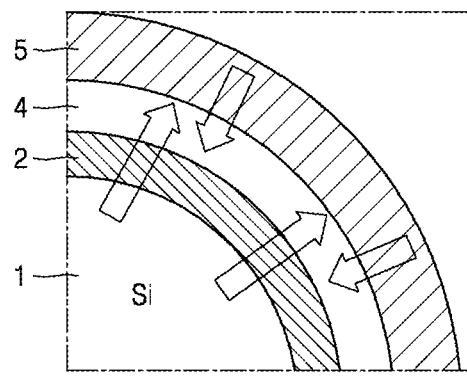
FIG. 1D is a schematic view illustrating a structure of a porous silicon composite cluster structure according to an embodiment.

Referring to FIG. 1D, in a porous silicon composite cluster structure according to an embodiment, carbon flakes 2 as a first layer may be on, e.g., directly on, the silicon 1 of the silicon primary particles, and the carbonaceous layer 5 as a second layer may surround the resultant structure. Also, the silicon primary particles may be porous. In other words, a porous silicon composite cluster structure according to an embodiment may have a structure in which carbon is directly grown in the form of flakes on the silicon 1. The porous silicon composite cluster structure may also include pores as a buffer space 4 to reduce volume expansion of the porous silicon composite. The carbonaceous layer 5 may serve as an external protective shell. Accordingly, a lithium battery with an improved lifespan and reduced resistance between an electrode and an electrolyte thereof may be manufactured using the porous silicon composite cluster structure as an anode active material.

Figure 1E:
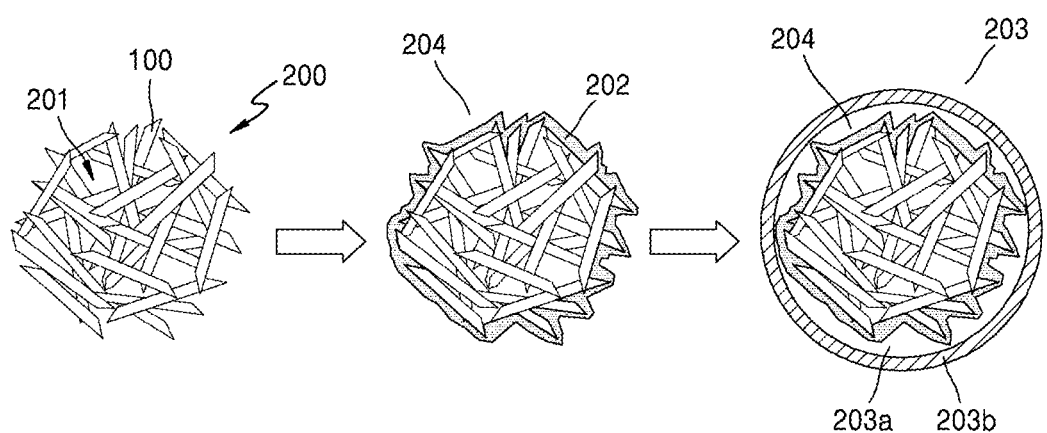
FIG. 1E illustrates an embodiment of a method of preparing a porous silicon composite cluster structure.
Figure 1F:
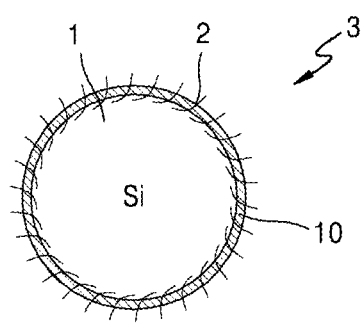
FIG. 1F is a schematic view that illustrates a structure of an embodiment of a porous silicon composite cluster.

Referring to FIG. 1F, a silicon primary particle 3 according to an embodiment may include: silicon 1; a silicon suboxide 10 of the formula $SiO_x$, wherein $0<x<2$, on the silicon 1, and a first carbon flake 2 on the silicon suboxide. In FIGS. 1A to 1C, the silicon suboxide is not shown for convenience of illustration.

Any suitable carbonaceous material in the form of a flake may be used as the carbon flakes. Examples of suitable carbonaceous materials include graphene, graphite, carbon fiber, graphitic carbon, and graphene oxide. A combination comprising at least one of the foregoing may be used.

The amorphous carbon of the carbonaceous layer may comprise pitch carbon, soft carbon, hard carbon, meso-phase pitch carbonization products, sintered cokes, carbon fiber, or a combination thereof.

The carbonaceous layer may further include a crystalline carbon. When the carbonaceous layer further includes the crystalline carbon, the carbonaceous layer may have an improved buffering function against volume expansion of the porous silicon composite cluster.

The crystalline carbon may comprise natural graphite, artificial graphite, graphene, carbon nanotube, fullerene, or a combination thereof.

A ratio of the carbon (hereinafter, "first carbon") of the first carbon flake and the second carbon flake to the carbon of the carbonaceous layer (hereinafter, "second carbon") may be about 30:1 to about 1:3 by weight, and in some embodiments, about 20:1 to about 1:1 by weight, and in some other embodiments, about 10:1 to about 1:0.9 by weight. When a ratio of the first carbon to the second carbon is within these ranges, a lithium battery with improved discharge capacity and improved capacity retention may be manufactured.

The ratio of the first carbon to the second carbon may be identified by thermogravimetric analysis (TGA).

The first carbon is associated with peaks appearing at about 700 to 750° C., and the second carbon is associated with peaks appearing at about 600 to 650° C. when analyzed by TGA.

The TGA may be performed at a temperature of 25° C. to about 1,000° C. under atmospheric conditions with a rate of temperature increase of about 10° C./min.

In an embodiment, the first carbon may be crystalline carbon, and the second carbon may be an amorphous carbon.

As used herein, the term "cluster" may refer to an aggregate of a plurality of primary particles, and may be construed as having substantially the same meaning as "secondary particle".

As used herein, the term "graphene" may have a structure of flakes, nanosheets, or a layer (or film), wherein the nanosheets may refer to an irregular structure of graphene on silicon suboxide, and the layer may refer to a continuous, uniform film of graphene on silicon suboxide. As such, the graphene may have a structure of layers or a structure without any distinct layers.

In an embodiment, the porous silicon composite secondary particle of the porous silicon composite cluster may have a size of about 3 micrometers (μm) to about 10 μm, and the carbon flakes may have a size of about 10 nanometers (nm) to about 100 nm. The term "size" used herein may refer to a diameter or a length of a major axis, e.g., a longest axis.

A diameter ratio, which is a ratio of a diameter of the porous silicon secondary particle to a diameter of the porous silicon composite cluster may be about 1:1.0001 to about 1:30, and in some embodiments, about 1:2 to about 1:30, and in some other embodiments, about 1:5 to about 1:25, and in still other embodiments, about 1:21. The diameter ratio of the porous silicon secondary particle to the porous silicon composite may refer to a ratio of sizes of the porous silicon composite secondary particle and the porous silicon composite cluster when both have a spherical shape, or may refer to a ratio of major axes, e.g., longest axes, when the porous silicon composite secondary particle and the porous silicon composite are non-spherical.

In an embodiment, the porous silicon composite secondary particle in the porous silicon composite cluster may have a diameter of about 3 μm to about 10 μm, and the shell may have a thickness of about 10 nm to about 5,000 nm (about 0.01 μm to about 5 μm), for example, about 10 nm to about 1,000 nm. A ratio of the core diameter and the shell (carbonaceous layer) thickness may be about 1:0.001 to about 1:1.67, and in an embodiment, about 1:0.01, about 1:1.67, about 1:0.0033, or about 1:0.5.

A total amount of the first carbon flake and the second carbon flake in the porous silicon composite cluster may be about 0.1 parts to about 2,000 parts by weight, and in some embodiments, about 0.1 parts to about 300 parts by weight, and in some other embodiments, about 0.1 parts to about 90 parts by weight, and in some other embodiments, about 5 parts to about 30 parts by weight, based on 100 parts by weight of the silicon. When the amount of carbon flakes is within these ranges, volume expansion of the silicon may be effectively suppressed, and improved conductivity may be obtained.

The first and second carbon flake of the porous silicon composite cluster may be, for example, graphene flake.

The first carbon flake of the silicon primary particle may be a graphene flake. This graphene flake may be separated from the silicon suboxide ($SiO_x$) (wherein $0<x<2$) by a distance of about 10 nm or less and may include a graphene layer, for example, about 1 to 30 graphene layers having a total thickness of about 0.3 nm to about 1,000 nm or less, and in some embodiments, about 0.3 nm to about 50 nm, and in some other embodiments, about 0.6 nm to 50 nm, and in still other embodiments, about 1 nm to 30 nm. The graphene may be oriented at an angle of 0° to about 90°, about 10° to about 80°, or about 20° to about 70°, with respect to a major axis of the silicon.

In some embodiments, the second carbon flake of the porous silicon secondary particle may be a graphene flake. This graphene flake may be separated from the silicon suboxide ($SiO_x$, where $0<x<2$) by a distance of about 1,000 nm, and in some embodiments, about 500 nm or less, and in some other embodiments, about 10 nm or less, and in still other embodiments, about 1 nm or less, and in yet still other embodiments, about 0.00001 nm to about 1 nm, may include at least one graphene layer, for example, 1 to 30 graphene layers, and may have a total thickness of about 0.6 nm to about 50 nm, and in some embodiments, about 1 nm to about 50 nm. The graphene may be oriented at an angle of 0° to about 90°, about 10° to about 80°, or about 20° to about 70° with respect to a major axis of the silicon.

The silicon suboxide ($SiO_x$, where $0<x<2$) may have a thickness of about 30 μm or less, and in some embodiments, about 10 μm or less, and in some other embodiments, about 1 to 100 nm, and in still other embodiments, about 10 nm. Also, the silicon suboxide may completely cover the surface of the silicon, or may partially cover the surface of the silicon, e.g., cover about 10% to about 99%, about 20% to about 95%, or cover about 40% to about 90% of the surface of the silicon.

The silicon may have any suitable shape, not limited to any specific form. For example, the silicon may be in the form of, for example, a sphere, a nanowire, a needle, a rod, a particle, a nanotube, a nanorod, a wafer, a nanoribbon, or a combination thereof. The silicon may have an average particle diameter of about 10 nm to about 30 μm, and in some embodiments, about 20 nm to about 150 nm, and in some other embodiments, about 100 nm.

The porous silicon composite secondary particle may have an average particle diameter (D50) of about 200 nm to about 50 μm, and in some embodiments, about 1 μm to about 30 μm, and in some other embodiments, about 1 μm to about 10 μm, and in still other embodiments, about 3 μm to about 5 μm. The porous silicon secondary particle may have a specific surface area of about 0.1 $m^2/g$ to about 100 $m^2/g$, and in some embodiments, about 1 $m^2/g$ to about 30 $m^2/g$. The porous silicon secondary particle may have a density of about 0.1 g/CC to about 2.8 g/CC, and in some embodiments, about 0.1 g/CC to about 2.57 g/CC, and in some other embodiments, 0.5 g/CC to about 2 g/CC.

The porous silicon composite cluster structure may further include a carbonaceous layer on a surface thereof. When the porous silicon composite further includes a carbonaceous layer, a lithium battery with improved lifetime characteristics, though with reduced initial efficiency, may be obtained.

A ratio of a diameter of the porous silicon composite to a thickness of the carbonaceous layer may be about 1:1 to about 1:50, and in some embodiments, about 1:1 to about 1:40, and in some other embodiments, about 1:0.0001 to about 1:1.

The carbonaceous layer may have a thickness of about 1 nm to about 5,000 nm, for example, about 10 nm to about 2,000 nm.

The carbonaceous layer may have a single-layered structure including amorphous carbon and crystalline carbon. The carbonaceous layer may have a double-layered structure having a first carbonaceous layer including amorphous carbon, and a second carbonaceous layer including crystalline carbon.

The first carbonaceous layer including amorphous carbon and the second carbonaceous layer including crystalline carbon may be sequentially stacked on the porous silicon composite cluster in this order. In some other embodiments, the second carbonaceous layer including crystalline carbon and the first carbonaceous layer including amorphous carbon may be sequentially stacked on the porous silicon composite cluster in this order.

The porous silicon composite secondary particle may have an average diameter (D50) of about 1 μm to about 30 μm, about 2 μm to about 25 μm, or about 3 μm to about 20 μm; a D10 of about 0.001 μm to about 10 μm, about 0.005 μm to about 5 μm, or about 0.01 μm to about 1 μm; and a D90 of about 10 μm to about 30 μm, about 12 μm to about 28 μm, or about 14 μm to about 26 μm.

The porous silicon composite cluster may have a narrow particle size distribution. For example, the porous silicon composite cluster structure may have an average diameter (D50) of about 1 μm to about 30 μm, about 2 μm to about 25 μm, or about 3 μm to about 20 μm; a D10 of about 0.001 μm to about 10 μm, about 0.005 μm to about 5 μm, or about 0.01 μm to about 1 μm; and a D90 of about 10 μm to about 30 μm, about 12 μm to about 28 μm, or about 14 μm to about 26 μm. A porous silicon composite cluster according to any of the embodiments may have a narrow particle size distribution within these ranges. Unlike the porous silicon composite cluster according to any of the embodiments, conventional silicon secondary particles obtained from silicon composite primary particles may have an irregular secondary particle size distribution, and thus it may be difficult to control a particle size of a negative active material so as to improve the cell performance.

In an embodiment, Graphene may suppress disintegration or pulverization of silicon particles which may occur in graphene-grown silicon primary particles. Graphene sliding layers may serve as a clamping layer which prevent disintegration of silicon particles, while also allowing for an alloying reaction of lithium ions with silicon (Si) to yield a significant specific capacity and provide a continuous conduction pathway between the particles.

The graphene layers may slide over one another while silicon particles swell, and then slide back to their relaxed positions during delithiation. While not wanting to be bound by theory, it is understood that this movement is because van der Waals forces are greater than the force of friction between the layers.

The clamping effect of the graphene layers serving as a clamping layer which prevents disintegration of silicon particles may be confirmed by evaluating whether the graphene layers remain the same after repeated lithiation/delithiation cycles.

In some embodiments, the porous silicon composite cluster may have an improved capacity, for example, a capacity of about 600 mAh/cc to about 2,000 mAh/cc.

According to an embodiment, a porous silicon composite cluster includes: a core including a porous silicon composite secondary particle; and a shell disposed on the core, the shell including a second carbon flake, wherein the porous silicon secondary particle includes an aggregate of a plurality, e.g., two or more, silicon composite primary particles, and the silicon composite primary particles may each include: a silicon oxide comprising i) a silicon suboxide ($SiO_x$, wherein 0<x<2), ii) a thermal treatment product of a silicon suboxide ($SiO_x$, wherein 0<x<2), or a combination thereof; and a first carbon flake disposed on the silicon suboxide.

As used herein, the expression "thermal treatment product of a silicon suboxide ($SiO_x$, wherein 0<x<2) may refer to a product obtained by thermally treating a silicon suboxide ($SiO_x$, wherein 0<x<2). The thermal treatment may refer to a thermal treatment that may induce a vapor deposition reaction for growing graphene flakes on the silicon suboxide ($SiO_x$, wherein 0<x<2). During the vapor deposition reaction, a carbon source gas or a gas mixture including a carbon source gas and a reducing gas may be used as a graphene flake source. The reducing gas may be, for example, hydrogen.

In some embodiments, the thermal treatment product of the silicon suboxide ($SiO_x$, wherein 0<x<2) may be a product obtained by thermally treating the silicon suboxide ($SiO_x$, wherein 0<x<2) in an atmosphere of i) a carbon source gas or ii) a gas mixture including a carbon source gas and a reducing gas.

In some embodiments, the thermal treatment product of the silicon suboxide ($SiO_x$, wherein 0<x<2) may be a structure including silicon (Si) arranged in a matrix of a silicon oxide ($SiO_y$, wherein 0<y≤2).

In some other embodiments, the thermal treatment product of the silicon suboxide ($SiO_x$, wherein 0<x<2) may be i) a structure including silicon (Si) arranged in a matrix of silicon oxide $SiO_2$, ii) a structure including silicon (Si) arranged in a matrix including silicon oxide ($SiO_2$) and a silicon suboxide ($SiO_y$, wherein 0<y<2), or iii) a structure including silicon (Si) arranged in a matrix of a silicon suboxide ($SiO_y$, wherein 0<y<2).

An embodiment of a method of preparing a porous silicon composite according to any of the above-described embodiments will now be further described with reference to FIG. 1E.

First, a structure including silicon and silicon suboxide ($SiO_x$, wherein 0<x<2) on the silicon may be pulverized to obtain silicon primary particles. As illustrated in FIG. 1E, the silicon primary particles may have, for example, a flat or needle-like shape.

The pulverized silicon primary particles may be mixed with a dispersing agent and a solvent to thereby obtain a composition. Next, porous silicon secondary particles 200 may be prepared from the composition. The porous silicon secondary particles 200 may include pores 201 and may have porosity of, for example, about 0.1% to about 50%, about 1% to about 40%, or about 5% to about 30%, and a pore size of about 10 nm to about 500 nm, about 20 nm to about 400 nm, or about 30 nm to about 300 nm.

The porous silicon secondary particles 200 may be prepared from the composition by any of a variety of methods, for example, co-precipitation, spray drying, or a solid phase method. For example, the porous silicon secondary particles may be prepared by spray drying. When the porous silicon secondary particles are prepared by spray drying, a particle diameter thereof may be controlled by appropriately choosing a spraying type, a pressurized gas supply rate, a composition supply rate, a drying temperature, and the like.

The spray drying may be performed at an atmospheric temperature of about room temperature (25° C.) to about 500° C., for example, about 50° C. to about 300° C., about 60° C. to about 250° C., or about 70° C. to about 200° C. When the spray drying is performed within these temperature ranges, particle agglomeration and blocking of a particle discharge outlet due to moisture condensation near the particle discharge outlet may be prevented, and the porous silicon secondary particles may have appropriate porosity.

In the spray drying, a spraying pressure may be about 1 bar to about 5 bar.

Prior to the spray drying, a surface area of the starting material may be increased as much as desirable, for example, by pulverization. To this end, pulverized silicon primary particles may be used as a starting material.

For example, when formed by spray drying, the obtained porous silicon secondary particles 200 may be spherical. The dispersing agent, for example, stearic acid, may partially remain on a surface of the porous silicon secondary particles 200.

Next, while a carbon source gas is supplied, the porous silicon secondary particles 200 may be thermally treated, so that carbon flakes 202 may be distributed on the porous silicon secondary particles 200, thereby preparing a porous silicon composite cluster 204.

A carbonaceous layer 203b may then be formed on a core 203a including the porous silicon composite cluster 204, to thereby obtain a porous silicon composite cluster structure 203.

The carbon source gas may fill the pores 201 in the porous silicon secondary particles 200 and then carbon flakes may form on outer surfaces of the silicon secondary particles 200.

The solvent may be an alcohol, for example, ethanol, methanol, or isopropyl alcohol. When these alcoholic solvents are used, the dispersing agent may be removed as the solvent is removed, so that an amount of the dispersing agent remaining in the porous silicon composite cluster may be reduced. As a result, an amount of oxygen may be reduced in the porous silicon composite cluster so that only a small amount of oxygen may remain.

The dispersing agent may uniformly disperse the silicon primary particles. The dispersing agent may be, but is not limited to, stearic acid, resorcinol, polyvinyl alcohol, carbon pitch, or a combination thereof. The amount of the dispersing agent may be about 1 part to about 15 parts by weight, for example, about 5 parts to about 10 parts by weight, based on 100 parts of a total weight of the composition. When the amount of the dispersing agent is within these ranges, silicon and graphene may be uniformly dispersed without agglomerating.

The carbon source gas may comprise a compound represented by Formula 1, a compound represented by Formula 2, and an oxygen-containing compound represented by Formula 3.

$$C_nH_{(2n+2-a)}[OH]_a \qquad \text{Formula 1}$$

In Formula 1, n may be an integer of 1 to 20, 2 to 18, or 4 to 16, and a may be 0 or 1.

$$C_nH_{(2n)} \qquad \text{Formula 2}$$

In Formula 2, n may be an integer of 2 to 6.

$$C_xH_yO_z \qquad \text{Formula 3}$$

In Formula 3, x may be an integer of 1 to 20, 2 to 18, or 4 to 16; y may be 0, an integer of 1 to 20, or 2 to 18; and z may be 1 or 2.

The carbon source gas may comprise, for example, methane, ethylene, propylene, methanol, ethanol, propanol, acetylene, or a combination thereof.

The thermal treatment may be performed at a temperature of about 600° C. to about 1,100° C., and in some embodiments, about 700° C. to about 1,000° C. When the thermal treatment is performed within these temperature ranges, graphene may be generated at a high density in the core, in the shell, or in the core and the shell.

When the carbon flakes are carbon nanotube flakes, carbon fiber flakes, graphitic carbon flakes, or graphene oxide flakes, the carbon flakes may be prepared using a method known in the art, the details of which may be selected without undue experimentation.

A composition including the porous silicon composite cluster 204, amorphous carbon, and the solvent may be mixed in a dry manner, thereby preparing a porous silicon composite cluster structure.

A small amount of additive can be added based on the content of the porous silicon composite. For example, the dry process refers to the case where 25 parts by weight or less of additives are used based on 100 parts by weight of the porous silicon composite. The wet process may refer to a case of 25 parts by weight or more, for example, 25 parts by weight to 150 parts by weight based on 100 parts by weight of the porous silicon composite.

The mixing in a dry manner ("dry mixing") may be followed by thermal treatment. This thermal treatment may be performed under inert gas atmospheres at a temperature of about 500° C. to about 1100° C., and in some embodiments, at about 950° C. to about 1050° C.

When the composition is mixed in a wet manner, a composition for forming the carbonaceous layer may permeate into the porous silicon composite cluster 204 and fill a buffer space therein. As a result, a volume expansion suppression effect of the resulting porous silicon composite cluster structure may be inadequate.

The dry mixing may be performing by mixing with a shaker, mortar grinder mixing, or mixing using mechanical milling. For example, using mechanical milling may enable more uniform coating of the carbonaceous layer. The mixing with a shaker may be performed by hand-mixing the composition including the porous silicon composite cluster 204, amorphous carbon, and the solvent, and shaking the composition several times.

The mortar grinder mixing is uniform mixing of the composition including the porous silicon composite cluster 204, amorphous carbon, and the solvent with a mortar.

The mixing using mechanical milling is mixing of the composition including the porous silicon composite cluster 204, amorphous carbon, and the solvent by mechanical friction with, for example, a roll mill, a ball mill, a high-energy ball mill, a planetary mill, a stirred ball mill, a vibrating mill, or a jet mill. For example, these mills may be operated at about 100 rpm to about 1000 rpm to mechanically apply compression stress to the composition.

In the dry mixing, an additive, for example, N-methylpyrrolidone, isopropyl alcohol, dimethylformamide, butanol, or acetone may be added. These additives may improve a binding strength between the ingredients during the dry mixing and also be spontaneously removed due to their strong volatility. The amount of the additive may be about 4 times or less by weight of a total weight of the ingredients used for dry mixing.

In some embodiments, the dry mixing may be performed at a temperature controlled to about 25° C. or less, and in some embodiments, within a range of about 15° C. to about 25° C.

In some embodiments, the dry mixing may be performed under a thermal treatment condition at a temperature of about 30° C. to about 80° C., and in some embodiments, about 50° C. to about 80° C., and in some other embodiments, about 60° C. to about 70° C.

In the composition including the porous silicon composite cluster, amorphous carbon, and the solvent, the amount of the amorphous carbon may be about 3 parts to about 40 parts by weight, and in some embodiments, about 5 parts to about 30 parts by weight, based on 100 parts by weight of the porous silicon composite cluster.

In some embodiments, the mixing of the composition including the porous silicon composite cluster, amorphous carbon, and the solvent may include milling at 7000 rpm to about 16,000 rpm, for example, at about 9,000 rpm to about 14,000 rpm.

As described above, the silicon primary particles may include silicon, silicon suboxide ($SiO_x$, wherein $0<x<2$) on the silicon, and graphene on the silicon oxide. The silicon suboxide ($SiO_x$, wherein $0<x<2$) is an unstable oxygen-deficient material as compared with silica ($SiO_2$), and tends to form a stable material by reacting with another reactive material, such as a carbon source gas. Based on this tendency of the silicon suboxide, the silicon suboxide ($SiO_x$, wherein $0<x<2$) may be used as a seed layer for forming graphene.

A thickness of the silicon suboxide ($SiO_x$, wherein $0<x<2$) layer on the silicon may significantly affect a shape and/or a structure of the graphene.

The thickness of the silicon suboxide ($SiO_x$, wherein $0<x<2$) layer may be varied by controlling a process involved in graphene formation, for example, by controlling a composition of the carbon source gas used to form graphene. The thickness of the silicon suboxide ($SiO_x$, wherein $0<x<2$) layer may be about 300 μm or less.

In some embodiments, the silicon suboxide ($SiO_x$, wherein $0<x<2$) layer may have a thickness of about 10 nm or less, and in some other embodiments, about 0.1 nm to about 10 nm, and in still other embodiments, about 0.1 nm to about 5 nm. When the thickness of the silicon suboxide layer is within these ranges, a lithium battery manufactured using the porous silicon composite cluster structure including the silicon suboxide ($SiO_x$, wherein $0<x<2$) may have improved capacity.

In some embodiments, by non-catalytic vapor carbon deposition, the graphene may be formed on the silicon suboxide ($SiO_x$, wherein $0<x<2$) layer on the silicon.

The vapor carbon deposition may include thermally treating the silicon covered with the silicon suboxide ($SiO_x$) under a gas atmosphere, the atmosphere including a gas comprising a compound represented by Formula 4, a compound represented by Formula 5, an first oxygen-containing compound represented by Formula 6, or a combination thereof.

$$C_nH_{(2n+2-a)}[OH]_a \qquad \text{Formula 4}$$

In Formula 4, n may be an integer of 1 to 20, 2 to 18, or 4 to 16, and a may be 0 or 1.

$$C_nH_{(2n)} \qquad \text{Formula 5}$$

In Formula 5, n may be an integer of 2 to 6.

$$C_xH_yO_z \qquad \text{Formula 6}$$

In Formula 6, x may be an integer of 1 to 20, 2 to 18, or 4 to 16, y may be 0 or an integer of 1 to 20, 2 to 18, or 4 to 16, and z may be 1 or 2.

In some embodiments, the carbon source gas may further include a second oxygen-containing compound represented by Formula 6a. The second oxygen-containing compound represented by Formula 6a may differ from the first oxygen-containing compound represented by Formula 6.

$$C_xH_yO_x \qquad \text{Formula 6a}$$

In Formula 6a, x may be 0 or an integer of 1 to 20, 2 to 18, or 4 to 16, y may be 0 or an integer of 1 to 20, 2 to 18, or 4 to 16, and z may be 1 or 2.

While not limited to this theory, it is understood that such coating by the above-described vapor carbon deposition is associated with reforming the silicon suboxide ($SiO_x$) covering the silicon by using $CO_2$ in the gas mixture.

According to the vapor carbon deposition, graphene may be directly formed on the silicon which is covered with silicon suboxide ($SiO_x$), and thus the silicon and the graphene may be strongly adhered to each other.

In some embodiments, even when a $SiO_x$ layer is not present on the silicon, by a process of reaction with a carbon-containing mixed gas and an oxygen-containing mixed gas, a $SiO_x$ layer may be formed first on the silicon by reaction with the oxygen-containing mixed gas, and then graphene may be formed thereon by reaction with the carbon-containing mixed gas.

A degree of adhesion between the silicon of the $SiO_x$ layer and the graphene may be evaluated by measuring a distance therebetween by scanning electron microscopy (SEM). The graphene may be separated from the silicon of the silicon oxide by a distance of about 10 nm or less, for example, about 5 nm to about 10 nm. In some embodiments, the graphene may be separated from the silicon by a distance of about 1 nm or less, for example, about 0.005 nm to about 1 nm. The graphene may be oriented at an angle of about 0° to about 90°, about 10° to about 80°, or about 20° to about 70° with respect to a major axis of the silicon. The graphene may include 1 to about 30, about 2 to about 25, or about 4 to about 20 graphene layers, and may have a total thickness of about 0.6 nm to about 12 nm, about 1 nm to about 10 nm, or about 2 nm to about 8 nm. The graphene may be oriented at an angle of 0° to about 90°, about 10° to about 80°, or about 20° to about 70° with respect to the major axis of the silicon.

The shape of the silicon may not be limited to any specific shape and, for example, may have a form of spheres, nanowires, needles, rods, particles, nanotubes, nanorods, a wafer, nanoribbons, or a combination thereof.

In some embodiments, the silicon may be in the form of needle-like particles. For example, the needle-like silicon particles may have a length of about 100 nm to about 160 nm, and in some embodiments, about 108 nm to about 125 nm; and may have a thickness of about 10 nm to about 100 nm, and in some embodiments, about 20 nm to about 50 nm, and in some other embodiments, about 40 nm.

In some embodiments, the silicon suboxide ($SiO_x$, wherein $0<x<2$) may be formed on needle-like silicon, and the graphene may be formed on the silicon oxide.

In some embodiments, the silicon suboxide ($SiO_x$, wherein $0<x<2$) may be formed on silicon particles, and the graphene may be formed on the silicon suboxide. The silicon nanoparticles may have an average particle diameter of about 40 nm to about 40 μm, for example, about 40 nm to about 100 nm.

When the silicon has the form of a wafer, the silicon wafer may have a thickness of about 2 mm or less, for example, about 0.001 mm to about 2 mm.

The graphene is a polycyclic aromatic molecule comprising a plurality of carbon atoms covalently bonded to one another, and the covalently bonded plurality of carbon atoms form a 6-membered ring as a basic repeating unit, but a 5-membered ring and/or a 7-membered ring may be included in the graphene. Accordingly, the graphene may be a single layer of the covalently bonded carbon atoms (in general, having an $sp^2$ bond). The graphene may include a single layer or multiple layers of carbon stacked upon one another, for example, one layer to about 100 layers, about 2 layers to about 100 layers, or about 3 layers to about 50 layers.

The graphene may have a structure of a nanosheet, a layer (or film), a nanographene nanosheet, or flakes. The term "nanosheet" refers to a structure of graphene formed in an irregular form on the silicon suboxide. The term "layer (or film)" refers to a continuous, uniform layered structure of graphene formed on the silicon suboxide.

In some embodiments, the porous silicon composite cluster may further include a metal oxide. When the porous silicon composite cluster further includes a metal oxide, formation of a solid electrolyte interphase (SEI) layer may be prevented due to suppression of a side reaction.

The metal oxide may include a magnesium oxide, a manganese oxide, an aluminum oxide, a titanium oxide, a zirconium oxide, a tantalum oxide, a tin oxide, a hafnium oxide, or a combination thereof.

In some embodiments, the carbon flakes such as graphene flakes in the porous silicon composite may serve as an SEI stabilization clamping layer. The porous silicon composite may have a large specific surface area, and thus may prevent a reduction in initial efficiency and volume energy density of a lithium battery when used in the lithium battery.

The graphene in the porous silicon composite cluster structure may suppress disintegration or pulverization of active materials such as silicon, and may improve conductivity of the porous silicon composite cluster. The graphene may suppress disintegration or pulverization of silicon particles. The graphene may serve as a clamping layer which prevents disintegration of silicon particles, while allowing for an alloying reaction of lithium ions with silicon (Si) to yield a significant specific capacity and provide a continuous conduction pathway between the particles.

The graphene layers may slide over each other while silicon particles swell, and then slide back to their relaxed positions during delithiation. This movement occurs because van der Waals forces are greater than the force of friction between the layers.

The clamping effect of the graphene layers, which prevents disintegration of silicon particles and allows the graphene layers to serve as a clamping layer, may be confirmed by evaluating whether the graphene layers remain the same after about 200 times of repeated lithiation/delithiation cycles.

In some embodiments, the porous silicon composite cluster structure may include nanosized pores between closely compacted carbon flakes such as graphene flakes on the silicon primary particles, the pores serving as a buffer during volume expansion of the primary and secondary particles. An SEI layer may also be stably formed on the silicon primary particles through thermal treatment. The graphene of the graphene flakes on the silicon porous composite secondary particles may slide over one another, expanding their volume while volume expansion and contraction of silicon occur, to prevent the silicon primary particles from being exposed to the outside of the secondary particles, and thus suppress contact of the silicon composite primary particles with an electrolyte.

According to another aspect of the present disclosure, a porous silicon composite cluster structure includes i) a porous silicon composite cluster disclosed in U.S. patent application Ser. No. 15/708,255 and ii) a carbonaceous layer on the porous silicon composite cluster. U.S. patent application Ser. No. 15/708,255 incorporated herein by reference.

The porous silicon composite cluster structure includes a porous core including an aggregate of a plurality of silicon composite primary particles, and the porous silicon composite secondary particle includes an aggregate of two or more silicon composite primary particles, and the silicon composite primary particles each comprise silicon, a silicon oxide of the Formula $SiO_x$, wherein $0<x<2$, disposed on the silicon, and a first graphene disposed on the silicon oxide; and a shell disposed on and surrounding the core, the shell including a second graphene. The carbonaceous layer is disposed on the porous silicon composite cluster, and the carbonaceous layer includes amorphous carbon.

The first graphene and the second graphene are the same as the first graphene and the second graphene of the U.S. patent application Ser. No. 15/708,255. For example, the porous silicon composite cluster structure is prepared by using acetylene as a reaction gas and by thermal treating at about 900° C.

The graphene may have a structure of flakes, nanosheets, or a layer (or film), wherein "nanosheets" means an irregular structure of graphene on the silicon oxide, and "layer" means a continuous, uniform film of graphene on the silicon oxide. As such, the graphene may have a structure of layers or a structure without distinct layers.

According to another aspect of the present disclosure, a carbon composite includes a porous silicon composite cluster structure according to any of the above-described embodiments and a carbonaceous material. A porous silicon composite cluster structure according to any of the embodiments may have a reduced specific surface area and an increased volume density (specific capacity), as compared with silicon primary particles, and thus may improve volume energy density and further reduce volume expansion of an electrode when mixed with a carbonaceous material.

The carbon composite may further improve initial efficiency, specific capacity characteristics, rate capability, and durability of the lithium battery using the carbon composite, as compared to when the porous silicon composite cluster structure is used alone.

In some embodiments, the carbonaceous material may comprise graphene, graphite, fullerene, carbon fibers, carbon nanotubes, or a combination thereof. For example, the amount of the carbonaceous material may be about 0.001 parts to about 99.999 parts by weight, and in some embodiments, about 10 parts to about 97 parts by weight, and in some other embodiments, about 50 parts to about 97 parts by weight, based on 100 parts by weight of the carbon composite. When the amount of the carbonaceous material of the carbon composite is within these ranges, a carbon composite with improved capacity and conductivity may be attained.

In some embodiments, the carbon composite may include graphite, and the porous silicon composite cluster structure on the graphite.

The graphite may be, for example, SFG6 graphite, and may have an average particle diameter of about 6 μm. When an electrode is formed using the carbon composite, an amount of the carbon composite in the electrode may be, for example, from about 68 parts to about 87 parts by weight, and an amount of a binder may be, for example, from about 13 parts to about 32 parts by weight. For example, an amount of the graphite in the carbon composite may be, for example, 1 part to about 20 parts by weight based on 100 parts by weight of the carbon composite.

The binder may be, for example, lithium polyacrylate.

The compound represented by Formula 1 and the compound represented by Formula 2 may each independently comprise methane, ethylene, propylene, methanol, ethanol, propanol, or a combination thereof.

The first oxygen-containing compound represented by Formula 3 may comprise, for example, carbon dioxide ($CO_2$), carbon monoxide (CO), water vapor ($H_2O$), or a combination thereof.

The carbon source gas may further comprise an inert gas comprising nitrogen, helium, argon, or a combination thereof.

The oxygen-containing compound may comprise carbon monoxide, carbon dioxide, water vapor, or a combination thereof.

When the oxygen-containing compound is used as the carbon source gas, the silicon sub oxide may be formed to have a larger thickness as compared with a thickness of a natural silicon oxide layer. For example, a thickness of the silicon sub oxide may be selected to be about 10 nm or less, for example, from about 0.5 nm to about 5 nm. When the thickness of the silicon suboxide is within these ranges, a shape and a thickness of the graphene may be appropriately controlled. In particular, when the silicon oxide has a thickness larger than that of a natural silicon oxide layer, the graphene layer on the silicon suboxide may have a denser structure than a graphene nanosheet. The graphene layer may include, for example, 5 to 10 graphene layers.

When the gas mixture includes water vapor, conductivity of the porous silicon composite cluster structure may further be improved. While not being limited to this theory, it is understood that since carbon having a high degree of crystallinity may be deposited, in the presence of water vapor, on the silicon coated with the silicon sub oxide by reacting with the gas mixture, the carbon composite may have high conductivity even when coated with a small amount of carbon. The amount of water vapor in the gas mixture, though not specifically limited, may be, for example, in a range of about 0.01% by volume to about 10% by volume based on 100% by volume of the carbon source gas.

In some embodiments, the carbon source gas may be methane, a mixed gas of methane and an inert gas, an oxygen-containing compound, or a mixed gas of methane and an oxygen-containing compound. In some other embodiments, the carbon source gas may comprise a mixed gas of $CH_4$ and $CO_2$, or a mixed gas of $CH_4$, $CO_2$, and $H_2O$.

The mixed gas of $CH_4$ and $CO_2$ may be supplied at a molar ratio of about 1:0.20 to about 1:0.50, and in some embodiments, at a molar ratio of about 1:0.25 to about 1:0.45, and in some other embodiments, at a molar ratio of about 1:0.30 to about 1:0.40.

The mixed gas of $CH_4$, $CO_2$, and $H_2O$ may be supplied at a molar ratio of about 1:0.20 to 0.50:0.01 to 1.45, and in some embodiments, at a molar ratio of about 1:0.25 to 0.45:0.10 to 1.35, and in some other embodiments, at a molar ratio of about 1:0.30 to 0.40:0.50 to 1.0.

In some embodiments, the carbon source gas may be carbon monoxide (CO) or carbon dioxide ($CO_2$). In some other embodiments, the carbon source gas may be a mixed gas of $CH_4$ and $N_2$.

The mixed gas of $CH_4$ and $N_2$ may be supplied at a molar ratio of about 1:0.20 to about 1:0.50, and in some embodiments, at a molar ratio of about 1:0.25 to 1:0.45, and in some other embodiments, at a molar ratio of about 1:0.30 to about 1:0.40. In some embodiments, the carbon source gas may not include an inert gas such as nitrogen.

The thermal treatment may be performed at a temperature of about 750° C. to about 1100° C., and in some embodiments, about 800° C. to about 1000° C.

The thermal treatment may be performed at any suitable pressure without limitation. The pressure level for the thermal treatment may be appropriately selected in consideration of a thermal treatment temperature, composition of the gas mixture, and a target amount of coated carbon. The pressure level for the thermal treatment may be controlled by varying amounts of inflow and outflow of the gas mixture. For example, the pressure for the thermal treatment may be about 1 atmosphere (atm) or greater, and in some embodiments, about 2 atm or greater, about 3 atm or greater, about 4 atm or greater, or about 5 atm or greater. However, embodiments are not limited thereto.

The thermal treatment time may not be specifically limited, and may be appropriately controlled depending on the thermal treatment temperature, thermal treatment pressure, composition of the gas mixture, and target amount of coated carbon. For example, the thermal treatment time may be in a range of about 10 minutes to about 100 hours, and in some embodiments, may be in a range of about 30 minutes to about 90 hours, and in some other embodiments, may be in a range of about 50 minutes to about 40 hours. However, embodiments are not limited thereto. While not limited to this theory, it is understood that the longer the thermal treatment time, the greater an amount of graphene (carbon) that may be deposited, and the better the electrical characteristics of the composite may become. However, these effects may not be directly proportional to the thermal treatment time. For example, deposition of graphene may stop or a deposition rate thereof may become low after a predetermined duration.

According to an embodiment, a method of preparing a porous silicon composite cluster structure according to an embodiment may provide a uniform coating of graphene on the silicon covered with the silicon suboxide ($SiO_x$), even at a relatively low temperature, through a vapor phase reaction of the carbon source gas as described above. Separation of the graphene from the silicon covered with the silicon suboxide ($SiO_x$) may substantially not occur. When a thickness of the silicon suboxide is appropriately controlled, the separation of the graphene may be even further suppressed. In this regard, a thickness of the silicon suboxide that may efficiently suppress separation of the graphene is about 10 nm or less, for example, from about 0.1 nm to about 10 nm, for example, from about 0.1 nm to about 5 nm.

Since the graphene is coated on the silicon through a vapor phase reaction to form a layer, the layer may have a high degree of crystallinity. When the porous silicon composite cluster structure is used as a negative active material, the negative active material may have improved conductivity without a structural change.

A process of preparing a carbon composite using a porous silicon composite cluster structure according to any of the embodiments may be as follows.

A porous silicon composite cluster structure according to an embodiment and a carbonaceous material may be mixed together and thermally treated.

The thermal treatment may be performed at a temperature of about 600° C. to about 1,100° C., for example, about 700° C. to about 1,000° C. When the thermal treatment temperature is within these ranges, a carbon composite with improved capacity characteristics may be attained.

In some embodiments, a porous silicon composite cluster structure or a carbon composite according to any of the above-described embodiments may be used in, for example, a battery, a field emission material for a display, a thermoelectric device, or a biosensor.

According to another aspect of the present disclosure, an electrode includes a porous silicon composite cluster structure or a carbon composite according to any of the above-described embodiments. The electrode may be an electrode for a lithium battery. The electrode may be a negative electrode.

The porous silicon composite cluster structure or the carbon composite may be used as an electrode active material, for example, a negative active material. In this regard, when the porous silicon composite cluster structure or the carbon composite is used as a negative active material, volume expansion and disintegration of silicon may be reduced or prevented. The negative active material may have improved conductivity, and may improve high-rate characteristics of a battery. Moreover, since a small amount of graphene may be coated on the silicon covered with the silicon suboxide, the negative active material may have improved energy density per volume. A lithium battery may be provided which may include the porous silicon composite cluster structure or the carbon composite, the carbon composite including a porous silicon composite cluster structure according to any of the embodiments and a carbonaceous material.

In some embodiments, the negative electrode may be manufactured in the following manner.

The negative electrode may be formed by molding, into a predetermined shape, a negative active material composition which may include, for example, a porous silicon composite cluster or a carbon composite according to an embodiment as a negative active material, a conducting agent, and a binder, or the negative electrode may be formed by coating the negative active material composition on a current collector, such as a copper (Cu) foil. Also, the negative active material composition may not include a conducting agent.

In some embodiments, the negative active material composition may be formed as a film on a separator without the current collector.

In particular, the negative active material composition may be prepared by mixing the negative active material, a conducting agent, a binder, and a solvent. The negative active material composition may be directly coated on a metal current collector to form a negative electrode plate. In some embodiments, the negative active material composition may be cast onto a separate support to form a negative active material film. The negative active material film may be separated from the support and then laminated on a metal current collector to thereby form a negative electrode. The negative electrode is not limited to having the above-listed forms, and may have any of a variety of forms.

The negative active material composition may further include a carbonaceous negative active material, in addition to the above-described negative active material. For example, the carbonaceous negative active material may comprise natural graphite, artificial graphite, expanded graphite, graphene, carbon black, fullerene soot, carbon nanotubes, graphitic carbon, carbon fibers, or a combination thereof. However, embodiments are not limited thereto. Any suitable carbonaceous negative active material available in the art may be used.

The conducting agent may be acetylene black, Ketjen black, natural graphite, artificial graphite, carbon black, carbon fibers, or a metal powder or metal fibers of copper, nickel, aluminum, or silver. The conducting agent may include a conductive material, such as a polyphenylene derivative, in combination. However, embodiments are not limited thereto. Any suitable conducting agent available in the art may be used.

The binder may be a vinylidene fluoride/hexafluoropropylene copolymer, polyvinylidenefluoride (PVDF), polyacrylonitrile, polymethylmethacrylate, polytetrafluoroethylene, mixtures thereof, a styrene-butadiene rubber-based polymer, polyacrylic acid, polyamide imide, or polyimide. However, embodiments are not limited thereto. Any suitable binder available in the art may be used.

The solvent may be N-methylpyrrolidone, acetone, or water. However, embodiments are not limited thereto. Any suitable solvent available in the art may be used.

The amounts of the negative active material, the conducting agent, the binder, and the solvent may be the same as those commonly used in lithium batteries. At least one of the conducting agent, the binder, and the solvent may be omitted depending on a use and a structure of a lithium battery.

In some embodiments, a lithium battery may include the negative electrode. The lithium battery may be manufactured in the following manner.

First, a negative electrode may be manufactured according to the above-described method of manufacturing a negative electrode.

Next, a positive active material composition may be prepared by mixing a positive active material, a conducting agent, a binder, and a solvent. The positive active material composition may be directly coated on a metal current collector and dried to manufacture a positive electrode. In some other embodiments, the positive active material composition may be cast on a separate support to form a positive active material film. The positive active material film may then be separated from the support and then laminated on a metal current collector, to thereby manufacture a positive electrode.

The positive active material may comprise lithium cobalt oxide, lithium nickel cobalt manganese oxide, lithium nickel cobalt aluminum oxide, lithium iron phosphate, lithium manganese oxide, or a combination thereof. However, embodiments are not limited thereto. Any suitable positive active materials available in the art may be used.

For example, the positive active material may be a lithium-containing metal oxide. Any suitable positive active material commonly used in the art may be used. For example, the positive active material may be a composite lithium oxide with at least one of cobalt (Co), manganese (Mn), and nickel (Ni), or a combination thereof. For example, the positive active material may be a compound represented by one of the following formulae: $Li_aA_{1-b}B'_bD_2$ (wherein $0.90 \leq a \leq 1$, and $0 \leq b \leq 0.5$); $Li_aE_{1-b}B'_bO_{2-c}D_c$ (wherein $0.90 \leq a \leq 1$, $0 \leq b \leq 0.5$, and $0 \leq c \leq 0.05$); $LiE_{2-b}B'_bO_{4-c}D_c$ (wherein $0 \leq b \leq 0.5$, and $0 \leq c \leq 0.05$); $Li_aNi_{1-b-c}Co_bB'_cD_\alpha$ (wherein $0.90 \leq a \leq 1$, $0 \leq b \leq 0.5$, $0 \leq c \leq 0.05$, and $0 < \alpha \leq 2$); $Li_aNi_{1-b-c}Co_bB'_cO_{2-\alpha}F_\alpha$ (wherein $0.90 \leq a \leq 1$, $0 \leq b \leq 0.5$, $0 \leq c \leq 0.05$, and $0 < \alpha < 2$); $Li_aNi_{1-b-c}Co_bB'_cO_{2-\alpha}F_2$ (wherein $0.90 \leq a \leq 1$, $0 \leq b \leq 0.5$, $0 \leq c \leq 0.05$, and $0 < \alpha < 2$); $Li_aNi_{1-b-c}Mn_bB'_cD_\alpha$ (wherein $0.90 \leq a \leq 1$, $0 \leq b \leq 0.5$, $0 \leq c \leq 0.05$, and $0 < \alpha \leq 2$); $Li_aNi_{1-b-c}Mn_bB'_cO_{2-\alpha}F'\alpha$ (wherein $0.90 \leq a \leq 1$, $0 \leq b \leq 0.5$, $0 \leq c \leq 0.05$, and $0 < \alpha < 2$); $Li_aNi_{1-b-c}Mn_bB'_cO_{2-\alpha}F'_2$ (wherein $0.90 \leq a \leq 1$, $0 \leq b \leq 0.5$, $0 \leq c \leq 0.05$, and $0 < \alpha < 2$); $Li_aN i_bE_cG_dO_2$ (wherein $0.90 \leq a \leq 1$, $0 \leq b \leq 0.9$, $0 \leq c \leq 0.5$, and $0.001 \leq d \leq 0.1$); $Li_aNi_bCo_cMn_dGeO_2$ (wherein $0.90 \leq a \leq 1$, $0 \leq b \leq 0.9$, $0 \leq c \leq 0.5$, $0 \leq d \leq 0.5$, and $0.001 \leq e \leq 0.1$); $Li_aNiG_bO_2$ (wherein $0.90 \leq a \leq 1$, and $0.001 \leq b \leq 0.1$); $Li_aCoG_bO_2$ (wherein $0.90 \leq a \leq 1$, and $0.001 \leq b \leq 0.1$); $Li_aMnG_bO_2$ (wherein $0.90 \leq a \leq 1$, and $0.001 \leq b \leq 0.1$); $Li_aMn_2G_bO_4$ (wherein $0.90 \leq a \leq 1$, and $0.001 \leq b \leq 0.1$); $QO_2$; $QS_2$; $LiQS_2$; $V_2O_5$; $LiV_2O_5$; $LiI'O_2$; $LiNiVO_4$; $Li_{(3-f)}J_2(PO_4)_3$ (wherein $0 \leq f \leq 2$); $Li_{(3-f)}Fe_2(PO_4)_3$ (wherein $0 \leq f \leq 2$); and $LiFePO_4$.

In the formulae above, A may be nickel (Ni), cobalt (Co), manganese (Mn), or a combination thereof; B' may be aluminum (Al), nickel (Ni), cobalt (Co), manganese (Mn), chromium (Cr), iron (Fe), magnesium (Mg), strontium (Sr), vanadium (V), a rare earth element, or a combination thereof; D may be oxygen (O), fluorine (F), sulfur (S), phosphorus (P), or a combination thereof; E may be cobalt (Co), manganese (Mn), or a combination thereof; F' may be fluorine (F), sulfur (S), phosphorus (P), or a combination thereof; G may be aluminum (Al), chromium (Cr), manganese (Mn), iron (Fe), magnesium (Mg), lanthanum (La), cerium (Ce), strontium (Sr), vanadium (V), or a combination thereof; Q may be titanium (Ti), molybdenum (Mo), manganese (Mn), or a combination thereof; I' may be chromium (Cr), vanadium (V), iron (Fe), scandium (Sc), yttrium (Y), or a combination thereof; and J may be vanadium (V), chromium (Cr), manganese (Mn), cobalt (Co), nickel (Ni), copper (Cu), or a combination thereof.

The compounds listed above as positive active materials may have a surface layer (e.g., "coating layer"). Alternatively, a mixture of a compound without a layer and a compound having a surface layer, the compounds being selected from the compounds listed above, may be used. The layer may include at least one compound of a coating element comprising an oxide, a hydroxide, an oxyhydroxide, an oxycarbonate, a hydroxycarbonate, or a combination thereof. The compounds for the layer may be amorphous or crystalline. The coating element for the layer may be magnesium (Mg), aluminum (Al), cobalt (Co), potassium (K), sodium (Na), calcium (Ca), silicon (Si), titanium (Ti), vanadium (V), tin (Sn), germanium (Ge), gallium (Ga), boron (B), arsenic (As), zirconium (Zr), or a mixture thereof. The layer may be formed by any suitable method that does not adversely affect physical properties of the positive active material when a compound is used as the coating element, for example, by a spray coating method, a dipping method, or the like. This is obvious to those of skill in the art, and thus a detailed description thereof will be omitted.

For example, the positive active material may comprise $LiNiO_2$, $LiCoO_2$, $LiMn_xO_{2x}$ (wherein x may be 1 or 2), $LiNi_{1-x}Mn_xO_2$ (wherein 0<x<1), $LiNi_{1-x-y}Co_xMn_yO_2$ (wherein 0≤x≤0.5 and 0≤y≤0.5), $LiFeO_2$, $V_2O_5$, TiS, MoS, or a combination thereof.

The conducting agent, the binder, and the solvent used in the positive active material composition may be the same as those used in the negative active material composition described above. In some embodiments, a plasticizer may further be added to the positive active material composition and/or the negative active material composition to obtain an electrode plate including pores.

The amounts of the positive active material, the conducting agent, the binder, and the solvent may be the same as those commonly used in lithium batteries. At least one of the conducting agent, the binder, and the solvent may be omitted depending on the use and structure of a lithium battery.

Next, a separator to be disposed between the positive electrode and the negative electrode may be prepared. The separator may be any suitable separator commonly used in lithium batteries. In some embodiments, the separator may have low resistance to migration of ions in an electrolyte and have a good electrolyte-retaining ability. For example, the separator may comprise glass fiber, polyester, Teflon, polyethylene, polypropylene, polytetrafluoroethylene (PTFE), or a combination thereof, each of which may be a non-woven or woven fabric. For example, a rollable separator including polyethylene or polypropylene may be used in a lithium ion battery. A separator with a good organic electrolytic solution-retaining ability may be used in a lithium ion polymer battery. For example, the separator may be manufactured in the following manner.

In some embodiments, a polymer resin, a filler, and a solvent may be mixed together to prepare a separator composition. Then, the separator composition may be directly coated on a support and then dried to thereby form the separator. In some other embodiments, the separator composition may be cast on a support and dried to form a separator film. The separator film may be separated from the support and laminated on an electrode to thereby form the separator.

The polymer resin used to manufacture the separator may be any suitable material used as a binder for electrode plates. For example, the polymer resin may be a vinylidene fluoride/hexafluoropropylene copolymer, PVDF, polyacrylonitrile, polymethylmethacrylate, or mixtures thereof.

The separator may include a ceramic composition to improve the separator functioning as a membrane. For example, the separator may be coated with an oxide or may be formed to include ceramic particles.

Next, an electrolyte may be prepared.

For example, the electrolyte may comprise an organic electrolyte. The electrolyte may be a solid. For example, the electrolyte may comprise a boron oxide or a lithium oxynitride. However, embodiments are not limited thereto. Any suitable solid electrolyte available in the art may be used. The solid electrolyte may be formed on the negative electrode by a method, for example, by sputtering.

For example, an organic electrolyte may be prepared. The organic electrolyte may be prepared by dissolving a lithium salt in an organic solvent.

The organic solvent may be any suitable organic solvent available in the art. For example, the organic solvent may be propylene carbonate, ethylene carbonate, fluoroethylene carbonate, butylene carbonate, dimethyl carbonate, diethyl carbonate, methylethyl carbonate, methylpropyl carbonate, ethylpropyl carbonate, methylisopropyl carbonate, dipropyl carbonate, dibutyl carbonate, chloroethylene carbonate, benzonitrile, acetonitrile, tetrahydrofuran, 2-methyltetrahydrofuran, γ-butyrolactone, dioxorane, 4-methyldioxorane, N,N-dimethyl formamide, N,N-dimethyl acetamide, dimethylsulfoxide, dioxane, 1,2-dimethoxyethane, sulfolane, dichloroethane, chlorobenzene, nitrobenzene, diethylene glycol, dimethyl ether, or mixtures thereof.

The lithium salt may be any suitable lithium salt available in the art. For example, the lithium salt may be $LiPF_6$, $LiBF_4$, $LiSbF_6$, $LiAsF_6$, $LiClO_4$, $LiCF_3SO_3$, $Li(CF_3SO_2)_2N$, $LiC_4F_9SO_3$, $LiAlO_2$, $LiAlCl_4$, $LiN(C_xF_{2x+1}SO_2)(C_yF_{2y+1}SO_2)$ (wherein x and y may be natural numbers), LiCl, LiI, or a mixture thereof.

Figure 2A:
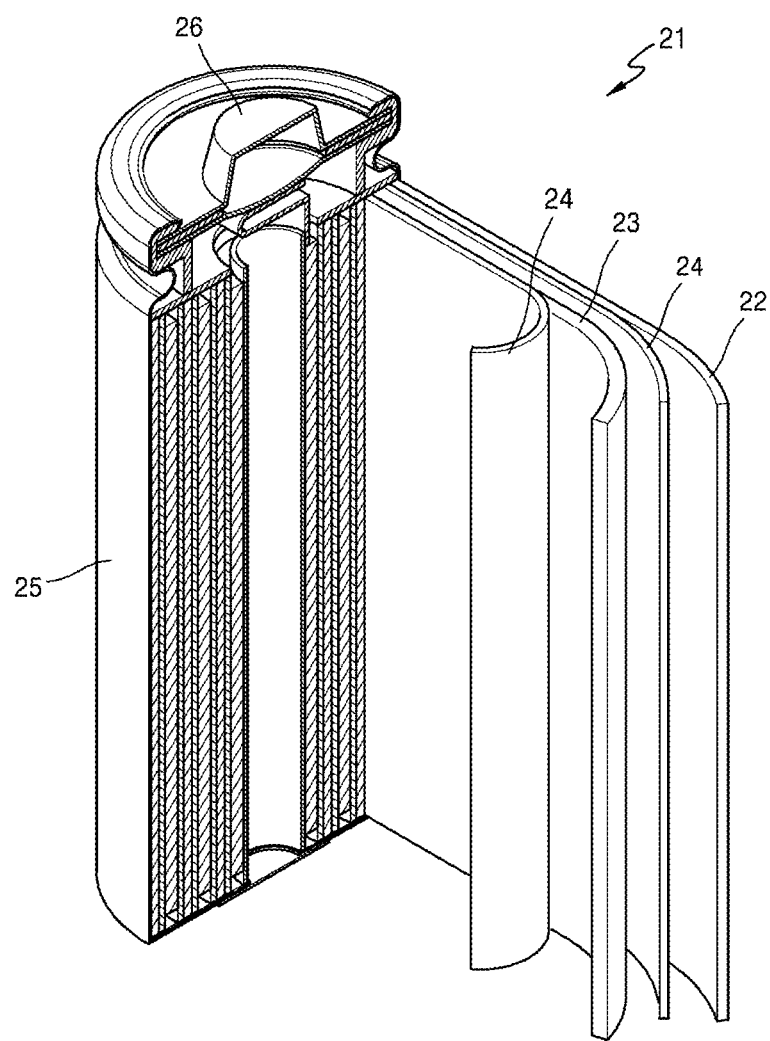
FIG. 2A is a schematic view of an embodiment of a lithium battery.

Referring to FIG. 2A, a lithium battery 21 according to an embodiment may include a positive electrode 23, a negative electrode 22, and a separator 24. The positive electrode 23, the negative electrode 22, and the separator 24 may be wound or folded, and then housed in a battery case 25. Then, the battery case 25 may be filled with an organic liquid electrolyte and sealed with a cap assembly 26, thereby completing the manufacture of the lithium battery 21. The battery case 25 may be a cylindrical type, a rectangular type, or a thin-film type. For example, the lithium battery 21 may be a thin-film type battery. For example, the lithium battery 21 may be a lithium ion battery.

The separator 24 may be interposed between the positive electrode 23 and the negative electrode 22 to form a battery assembly. A plurality of such battery assemblies may be stacked in a bi-cell structure and impregnated with an organic electrolyte solution. The resultant battery assembly may then be put into a pouch and hermetically sealed to thereby complete the manufacture of a lithium ion battery.

In some embodiments, a plurality of battery assemblies may be stacked upon one another to form a battery pack, which may be used in any device that requires high capacity and high output, for example, in a laptop computer, a smartphone, an electric vehicle, and the like.

A lithium battery including such a battery pack may have improved high-rate characteristics and lifetime characteristics, and thus may be applicable in an electric vehicle (EV), for example, in a hybrid vehicle such as a plug-in hybrid electric vehicle (PHEV).

According to another aspect of the present disclosure, a field emission device includes a porous silicon composite cluster structure according to any of the embodiments, or a carbon composite including a porous silicon composite cluster structure according to any of the embodiments and a carbonaceous material.

A field emission device is a device using migration of electrons. In general, a field emission device may include, at least, a reduction electrode, an emitter tip, and an oxidation electrode separated from the reduction electrode (refer to U.S. Pat. Nos. 7,009,331; 6,976,897; 6,911,767; and US 2006/0066217, the disclosures of which are incorporated in their entirety by reference). The emitter tip may emit electrons as a voltage is applied between the reduction electrode and the oxidation electrode. The electrons may migrate from the reduction electrode toward the oxidation electrode. A field emission device according to an embodiment of the present disclosure may be used for various purposes, for example, in ultrasonic vacuum tube equipment (for example, an X-ray tube), a power amplifier, an ion gun, a high-energy accelerator, a free-electron laser, and an electron microscope, and specifically, in a flat display device. A flat display device may be used as an alternative to a cathode ray tube, and may also be applicable in a TV or a computer monitor.

A porous silicon composite cluster structure according to any of the embodiments or a carbon composite including the same may be used as the emitter tip.

A conventional emitter tip may be manufactured using a metal such as molybdenum (Mo) or a semiconductor such as silicon. One of the concerns with using the metal emitter is a comparatively high control voltage of about 100V required for emission. In addition, due to nonuniformity of such conventional emitter tips, current densities of individual pixels of a field emission device using the conventional emitter tips may be nonuniform.

When a porous silicon composite cluster structure or carbon composite according to any of the embodiments is used as the emitter tip, the field emission device may have improved field emission characteristics.

A porous silicon composite cluster structure or carbon composite according to any of the embodiments may be used to manufacture an electroluminescent device.

According to another aspect of the present disclosure, a biosensor includes a porous silicon composite according to any of the above-described embodiments, or a carbon composite including a porous silicon composite according to any of the above-described embodiments and a carbonaceous material.

The porous silicon composite cluster structure or carbon composite according to any of the embodiments may be used to form an electrode for a biosensor.

Figure 2B:
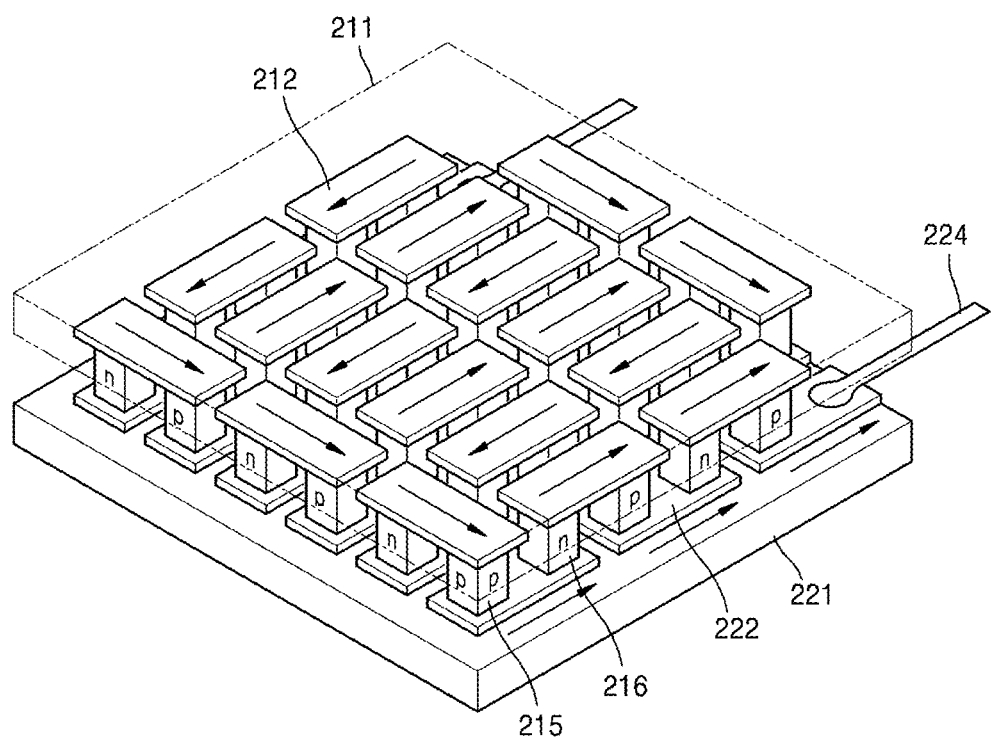
FIG. 2B is a schematic view of an embodiment of a thermoelectric module.
Figure 2C:
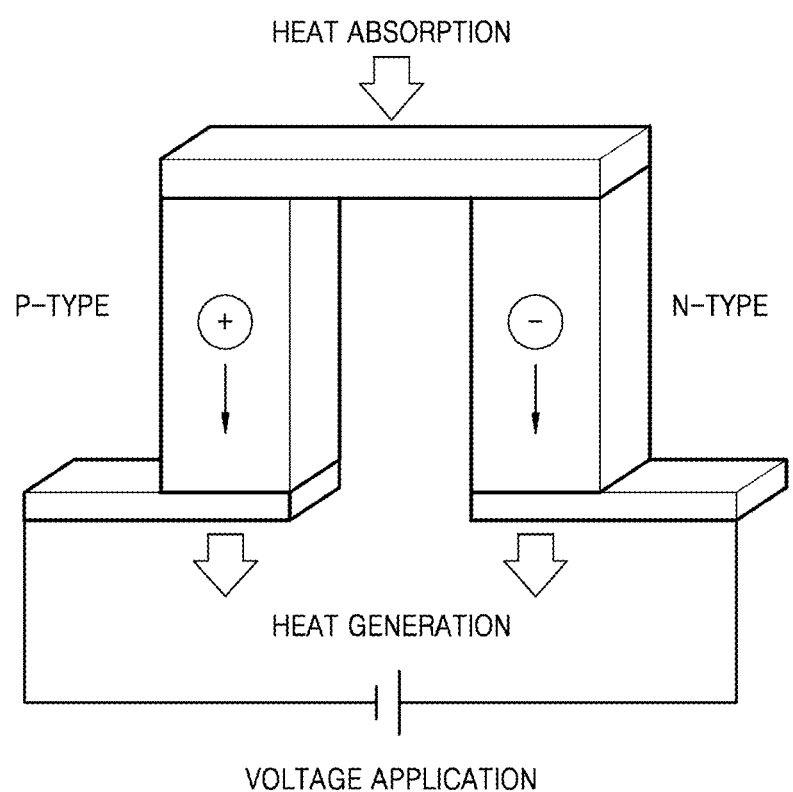
FIG. 2C is a schematic diagram illustrating an embodiment of a thermoelectric cooler using the Peltier effect.
Figure 2D:
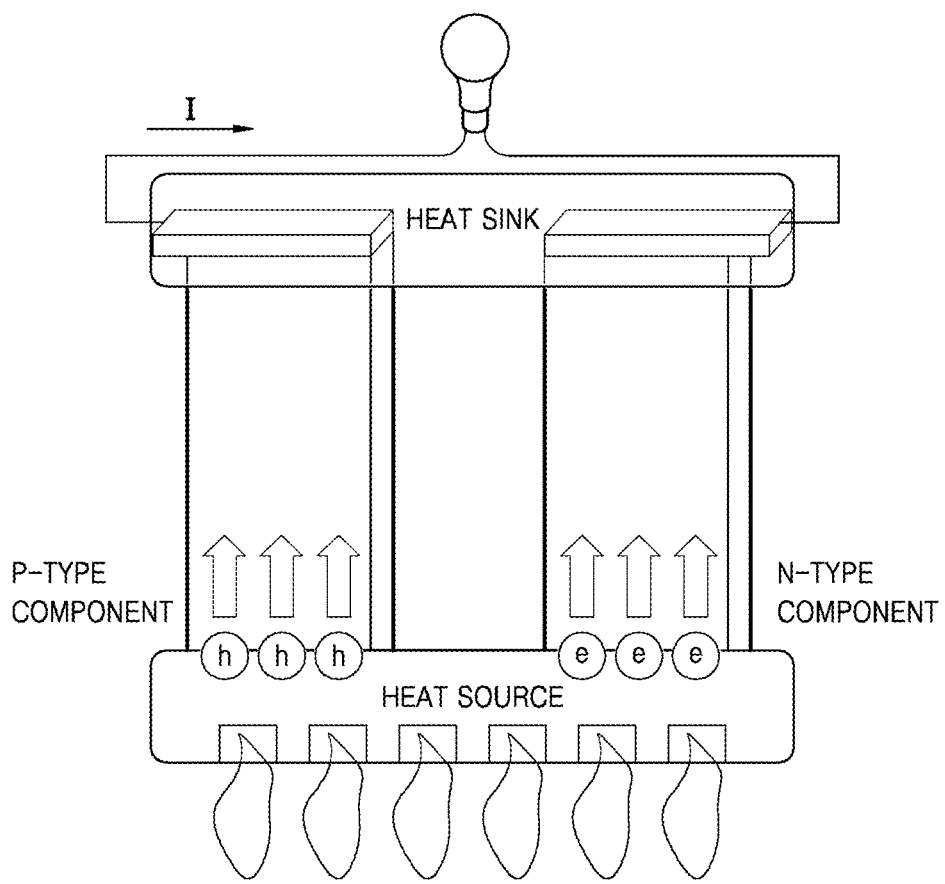
FIG. 2D is a schematic diagram illustrating an embodiment of a thermoelectric generator using the Seebeck effect.
Figure 2E:
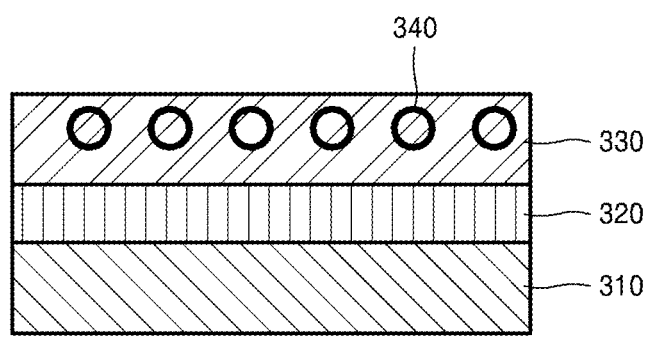
FIG. 2E illustrates a structure of an electrode of an embodiment of a biosensor.

FIG. 2E is a schematic cross-sectional view illustrating a structure of an electrode of a biosensor according to an embodiment of the present disclosure.

Referring to FIG. 2E, the electrode of a biosensor may include a substrate 310, a first layer 320 on the substrate 310, the first layer 320 including a porous silicon composite cluster structure or carbon composite according to any of the embodiments, and a second layer 330 on the first layer 320. A biomaterial 340 may be supported by or fixed in the second layer 330 in a variety of manners.

The substrate 310 may be any suitable substrate or plate on which graphene may be deposited or formed, and for example, may comprise glass, plastic, metal, ceramic, silicon, or a combination thereof. A type of the substrate 310 is not specifically limited, provided that graphene may be deposited or formed thereon.

The biomaterial 340 may include enzyme, aptamer, protein, nucleic acid, microorganism, cell, lipid, hormone, DNA, PNA, RNA, or a combination thereof. Any suitable biomaterial may also be used.

Referring to FIG. 2E, in the electrode of a biosensor, the biomaterial 340 may be an enzyme, and the second layer 330 may be a layer able to support the enzyme or have the enzyme fixed therein. Although according to FIG. 2E an enzyme as the biomaterial 340 appears as being supported by or fixed in the second layer 330, the location of the enzyme is not limited thereto, and the enzyme may partially or entirely protrude through a surface of the second layer 330 and be exposed. When a biosensor has this structure including an enzyme with substrate specificity to selectively respond to a target molecule in a mixture, the biosensor may selectively sense an analyte (for example, blood sugar) to which the enzyme responds.

According to another aspect of the present disclosure, a semiconductor device includes a porous silicon composite cluster structure according to any of the above-described embodiments, or a carbon composite including a porous silicon composite cluster structure according to any of the above-described embodiments and a carbonaceous material.

The porous silicon composite cluster structure or the carbon composite may be used as an electrode of the semiconductor device.

According to another aspect of the present disclosure, there are provided a thermoelectric material and a thermoelectric device, each including a porous silicon composite cluster structure according to any of the above-described embodiments, or a carbon composite including a porous silicon composite cluster structure according to any of the above-described embodiments and a carbonaceous material.

The thermoelectric material may have good electrical characteristics, and consequently may have improved thermoelectric performance. The thermoelectric material may be used in a thermoelectric device, a thermoelectric module, or a thermoelectric system.

The performance of the thermoelectric material is evaluated using a dimensionless figure of merit (ZT), which is defined by Equation 1.

$$ZT=(S^2\sigma T)/k \qquad \text{Equation 1}$$

In Equation 1, ZT is a figure of merit, S is a Seebeck coefficient, σ is electrical conductivity, T is an absolute temperature, and k is thermal conductivity.

As represented in Equation 1, a higher ZT value of a thermoelectric material may be obtained by increasing the Seebeck coefficient (S) and the electrical conductivity (σ) of the thermoelectric material, i.e., a power factor ($S^2\sigma$), and reducing the thermal conductivity (k) of the thermoelectric material.

A porous silicon composite cluster structure or carbon composite according to any of the above-described embodiments may include graphene, and thus provide high electrical conductivity and low thermal conductivity to a thermoelectric material when included therein, according to the characteristics of the graphene, and improve performance of the thermoelectric material.

In a porous silicon composite cluster structure or carbon composite according to any of the above-described embodiments, crystalline characteristics and an electron structure may be changed at an interface between the metallic graphene and semi-conductive silicon to increase a Seebeck coefficient thereof and accelerate transfer of charge particles, which may consequently induce an increase in electrical conductivity and charge mobility. In addition, phonon scattering at the interface between the graphene and the silicon may be increased such that it may be possible to control the thermal conductivity of the thermoelectric material.

Such a porous silicon composite cluster structure or carbon composite according to any of the above-described embodiments may be effectively used as a thermoelectric material. A thermoelectric device may be manufactured by processing the thermoelectric material into a shape, for example, by cutting. The thermoelectric device may be a p-type thermoelectric device. The thermoelectric device may be a structure formed by shaping the thermoelectric material in a predetermined shape, for example, in a rectangular parallelepiped shape.

The thermoelectric device may have a cooling effect when it is combined with an electrode and a current is applied thereto, and may have a power generation effect based on a temperature difference.

FIG. 2B is a schematic view of a thermoelectric module using a thermoelectric device according to an embodiment of the present disclosure. Referring to FIG. 2B, an upper electrode (first electrode) 212 and a lower electrode (second electrode) 222 are patterned on an upper insulating substrate 211 and a lower insulating substrate 221, respectively. The upper electrode 212 and the lower electrode 222 may contact a p-type thermoelectric component 215 and an n-type thermoelectric component 216. The upper electrode 212 and the lower electrode 222 may be connected to the outside of the thermoelectric device by a lead electrode 224. The p-type thermoelectric component 215 may be a thermoelectric device according to any of the above-described embodiments. The n-type thermoelectric component 216 may not be specifically limited, and may be any suitable material known in the art.

The upper and lower insulating substrates 211 and 221 may include gallium arsenic (GaAs), sapphire, silicon, Pyrex, or quartz. The upper and lower electrodes 212 and 222 may include, for example, copper, aluminum, nickel, gold, or titanium, and may have various sizes. The upper and lower electrodes 212 and 222 may be formed using any suitable patterning method, for example, a lift-off semiconductor process, a deposition method, or a photolithography technique.

In some embodiments, one of the first and second electrodes 212 and 222 in the thermoelectric module may be exposed to a heat source as illustrated in FIGS. 2C and 2D. In some other embodiments, one of the first and second electrodes 212 and 222 in the thermoelectric device module may be electrically connected to a power supply source, or to the outside of the thermoelectric module, for example, to an electric device (for example, a battery) that consumes or stores electric power.

In some embodiments, one of the first and second electrodes 212 and 222 in the thermoelectric module may be electrically connected to a power supply source.

An embodiment of the present disclosure will now be described in detail with reference to the following examples. However, these examples are only for illustrative purposes and are not intended to limit the scope of the embodiments of the present disclosure.

EXAMPLES

Preparation Example 1: Porous Silicon Composite Cluster

Needle-like silicon was pulverized to obtain plate- and needle-like silicon particles having a silicon suboxide ($SiO_x$, wherein $0<x<2$) layer (having a thickness of about 0.1 nm) on a surface thereof, a length of about 125 nm, and a thickness of about 40 nm.

A composition including 25 parts by weight of the plate- and needle-like silicon particles, 10 parts by weight of stearic acid, and 65 parts by weight of isopropyl alcohol was spray-dried, and then dried to obtain porous silicon secondary particles having an average particle diameter in a range of about 3 μm to about 6 μm.

The spray-drying was performed using a spray drier (MMSD Micro Mist Spray Dryers, Fujisaki Electric). The spray nozzle size, pressure under a $N_2$ atmosphere, and powder spray atmosphere temperature (about 200° C.) were controlled, and the resultant was dried under these conditions to remove isopropyl alcohol and thereby prepare porous silicon secondary particles.

The porous silicon secondary particles were loaded into a reactor. A gas including methane ($CH_4$, 300 sccm) was supplied into the reactor to create an atmosphere of the gas. A pressure level inside the reactor resulting from the supply of the gas was 1 atm. The internal temperature of the reactor was increased to 1,000° C. (at a rate of about 23° C./min) under the atmosphere of the gas, and while the gas was continuously supplied into the reactor, thermal treatment was performed at 1,000° C. for about 1 hour. The resulting product was left for about 4 hours so that graphene flakes were formed on the porous silicon secondary particles. Then, the supply of the gas was stopped, and the reactor was cooled down to room temperature (25° C.), thereby obtaining a porous silicon composite cluster including the porous silicon secondary particles and highly crystalline second graphene flakes on the porous silicon secondary particles, the porous silicon secondary particles each including an aggregate of two or more silicon primary particles including silicon, a silicon suboxide ($SiO_x$, where $0<x<2$) on the silicon, and first graphene flakes on the silicon suboxide.

A total amount of the first graphene flakes and the second graphene flakes in the porous silicon composite cluster was about 25 parts by weight based on 100 parts by weight of a total weight of the porous silicon composite cluster.

Preparation Example 2: Porous Silicon Composite Cluster

A porous silicon composite cluster was prepared in the same manner as in Preparation Example 1, except that the thermal treatment conditions were controlled to obtain the porous silicon composite cluster including the porous silicon secondary particles and highly crystalline graphite flakes, instead of the graphene flakes, on the porous silicon secondary particles.

Example 1: Porous Silicon Composite Cluster Structure 65 parts by weight of the porous silicon composite cluster prepared in Preparation Example 1, 20 parts by weight of coal tar pitch, and 15 parts by weight of N-methylpyrrolidone were mixed to obtain a composition.

The composition was dry-milled for 10 minutes and then thermally treated under an argon gas atmosphere at about 1,000° C. for 3 hours, thereby preparing a porous silicon composite cluster structure in which a carbonaceous layer including the coal tar pitch was on the porous silicon composite cluster structure. The dry milling was performed at about 12,000 rpm at a temperature controlled to about 50° C.

In the porous silicon composite cluster structure prepared in Example 1, a ratio of the carbon of the graphene flakes to the carbon of the carbonaceous layer was about 6:4 by weight.

Example 2: Porous Silicon Composite Cluster Structure 65 parts by weight of the porous silicon composite cluster prepared in Preparation Example 1, 10 parts by weight of coal tar pitch, 10 parts by weight of graphite, and 15 parts by weight of N-methylpyrrolidone were mixed to obtain a composition.

The composition was dry-milled for 10 minutes and then thermally treated under an argon gas atmosphere at about 1,000° C. for 3 hours, thereby preparing a porous silicon composite in which a carbonaceous layer including the coal tar pitch and the graphite was on the porous silicon composite cluster structure.

The dry milling was performed at about 12,000 rpm at a temperature controlled to about 50° C.

In the porous silicon composite cluster structure prepared in Example 2, a ratio of the carbon of the graphene flakes to the carbon of the carbonaceous layer was about 6:4 by weight, and a ratio of the coal tar pitch to the graphite in the carbonaceous layer was about 1:1 by weight.

Comparative Example 1

Silicon primary particles were stacked in three dimensions to obtain a silicon secondary aggregate cluster including macro-sized silicon secondary particles having a size of about 5 µm.

Comparative Example 2

A silicon/carbon (Si/C) compact structure was prepared according to the following procedure. The Si/C compact structure had a structure not including pores.

19 parts by weight of nanostructured and amorphous silicon, 50 parts by weight of graphite, 10 parts by weight of coal tar pitch, and 21 parts by weight of N-methylpyrrolidone were mixed to obtain a composition.

The Si/C compact structure was prepared by a dry complexation process of the composition. The dry complexation process was performed at about 12,000 rpm at a temperature controlled to about 50° C.

Comparative Example 3

A Si/C porous structure was prepared according to the following procedure.

20 parts by weight of porous silicon, 20 parts by weight of graphite, 40 parts by weight of coal tar pitch, and 20 parts by weight of N-methylpyrrolidone were mixed to obtain a composition. The composition was mixed with isopropyl alcohol, spray-dried, and then dried to obtain Si/C porous structure particles having an average particle diameter of about 5-8 µm. The spray drying was performed using a spray drier (Model name: MMSD Micro Mist Spray Dryers, available from Fujisaki Electric). The spray nozzle size, pressure under a $N_2$ atmosphere, and the powder spray temperature (about 1200° C.) were controlled to remove the isopropyl alcohol by drying, thereby preparing porous silicon secondary particles. The Si/C porous structure included pores, and had a porosity of about 55%.

Comparative Example 4

65 parts by weight of the Si/C porous structure prepared according to Comparative Example 3, 20 parts by weight of coal tar pitch, and 15 parts by weight of N-methylpyrrolidone were mixed to prepare a composition.

The composition was dry-milled, and then thermally treated under an argon gas atmosphere at about 1,000° C., thereby preparing Si/C porous composite structure in which a carbonaceous layer including the coal tar pitch was on the Si/C porous structure.

The dry milling was performed at about 12,000 rpm at a temperature controlled to about 50° C.

Comparative Example 4a

20 Parts by weight of coal tar pitch, and 80 parts by weight of N-methylpyrrolidone were mixed to prepare a mixture, and the mixture was coated on the 65 parts by weight of the porous silicon composite cluster prepared in Preparation Example 1, and then dried at about 200° C., followed by thermal treatment under an argon gas atmosphere at about 1,000° C.

Example 3: Manufacture of Negative Electrode and Coin Full Cell

The porous silicon composite cluster structure of Example 1, graphite, carbon black (KB600JD), lithium-substituted polyacrylate (Li-PAA), and N-methylpyrrolidone (NMP) as a solvent were mixed to prepare a slurry. A ratio of a mixture of the porous silicon composite cluster structure of Example 1 and graphite, carbon black (KB600JD), and lithium-substituted polyacrylate in the slurry was about 91:1:8 by weight on a solid basis. A ratio of the porous silicon composite cluster structure of Example 1 to graphite in the mixture was about 7:84 (1:12) by weight.

The slurry was applied to a copper (Cu) foil using a doctor blade to form a film having a thickness of about 40 µm. The film was vacuum-dried at about 120° C. for about 2 hours and roll-pressed, thereby manufacturing a negative electrode.

A positive electrode was manufactured using a slurry obtained by mixing $LiNi_{0.6}Co_{0.2}Mn_{0.2}$, Super P, lithium-substituted polyacrylate (Li-PAA) as a binder, and NMP as a solvent. A ratio of $LiNi_{0.6}Co_{0.2}Mn_{0.2}$, Super P, and Li-PAA as a binder in the slurry was about 93:5:2 by weight. The slurry was applied to an aluminum (Al) foil using a doctor blade to form a film having a thickness of about 40 µm. The film was vacuum-dried at about 120° C. for about 2 hours and roll-pressed, thereby manufacturing the positive electrode.

A coin full cell was manufactured using the negative electrode and the positive electrode. A polypropylene membrane (Celgard 3510) was used as a separator, and an electrolyte was used which included 1.3M $LiPF_6$ in a mixture of ethylene carbonate (EC), diethyl carbonate (DEC), and fluoroethylene carbonate (FEC) at a volume ratio of about 2:6:2.

Example 4: Manufacture of Negative Electrode and Coin Full Cell

A negative electrode and a coin full cell were manufactured in the same manner as in Example 3, except that the porous silicon composite cluster structure of Example 2 was used instead of the porous silicon composite cluster of Example 1.

Example 5: Manufacture of Negative Electrode and Coin Half Cell

The porous silicon composite cluster structure of Example 1, carbon black (KB600JD), AST9005 (AEKYUNG, Republic of Korea), and NMP as a solvent were mixed to prepare a slurry. A ratio of the mixture of the porous silicon composite cluster of Example 1, carbon black (KB600JD), and AST9005 (AEKYUNG, Republic of Korea) was about 79:1:20 by weight on a solid basis.

The slurry was applied to a Cu foil using a doctor blade to form a film having a thickness of about 40 μm. The film was vacuum-dried at about 120° C. for about 2 hours and roll-pressed, thereby manufacturing a negative electrode.

A coin half cell (CR2032) was manufactured using the negative electrode and lithium metal as a counter electrode. A polypropylene membrane (Celgard 3510) was used as a separator, and an electrolyte was used which included 1.3M LiPF$_6$ in a mixture of EC, DEC, and FEC at a volume ratio of about 2:6:2.

Example 6: Manufacture of Negative Electrode and Coin Half Cell

A negative electrode and a coin half-cell were manufactured in the same manner as in Example 5, except that the porous silicon composite of Example 2 was used instead of the porous silicon composite of Example 1.

Example 7: Porous Silicon Composite Cluster Structure

A porous silicon composite cluster structure was prepared in the same manner as in Example 1, except that the ratio of carbon of the graphene flakes to carbon of the carbonaceous layer in the porous silicon composite was 1:0.9 by weight, instead of 6:4 by weight.

Example 8: Porous Silicon Composite Cluster Structure

A porous silicon composite cluster structure was prepared in the same manner as in Example 1, except that the ratio of carbon of the graphene flakes to carbon of the carbonaceous layer in the porous silicon composite was 10:1 by weight, instead of 6:4 by weight.

Example 9: Porous Silicon Composite Cluster Structure

A porous silicon composite cluster structure was prepared in the same manner as in Example 1, except that dry-milling of the composition was performed at about 9,000 rpm.

Example 10: Porous Silicon Composite Cluster Structure

A porous silicon composite cluster structure was prepared in the same manner as in Example 1, except that dry-milling of the composition was performed at a temperature controlled to about 17° C.

Example 11: Porous Silicon Composite Cluster Structure

A porous silicon composite cluster structure was prepared in the same manner as in Example 1, except that dry-milling of the composition was performed at a temperature controlled to about 70° C.

Comparative Examples 4 to 6: Manufacture of Negative Electrode and Coin Full Cell Negative electrodes and coin full cells were manufactured in the same manner as in Example 3, except that the materials prepared in Comparative Examples 1 to 3 were used, respectively, instead of the porous silicon composite cluster structure prepared in Example 1.

Comparative Examples 7 to 9: Manufacture of Negative Electrode and Coin Half Cell Negative electrodes and coin half cells were manufactured in the same manner as in Example 5, except that the materials prepared in Comparative Examples 1 to 3 were used, respectively, instead of the porous silicon composite cluster structure prepared in Example 1.

Comparative Example 10: Manufacture of Negative Electrode and Coin Full Cell A negative electrode and a coin full cell were manufactured in the same manner as in Example 3, except that BTR Gen2 (Si particles inside as well as on graphite) was used instead of the porous silicon composite cluster structure prepared in Example 1. BTR Gen2 is an active material including Si particles inside and on graphite and having an average particle diameter of about 150 nm.

Comparative Example 11: Manufacture of Negative Electrode and Coin Full Cell A negative electrode and a coin full cell were manufactured in the same manner as in Example 3, except that the structure prepared in Comparative Example 4a was used instead of the porous silicon composite cluster structure prepared in Example 1.

Evaluation Example 1: Charge and Discharge Characteristics (1) Initial Efficiency and Lifespan
1) Example 3, and Comparative Examples 4 to 6

Figure 8A:
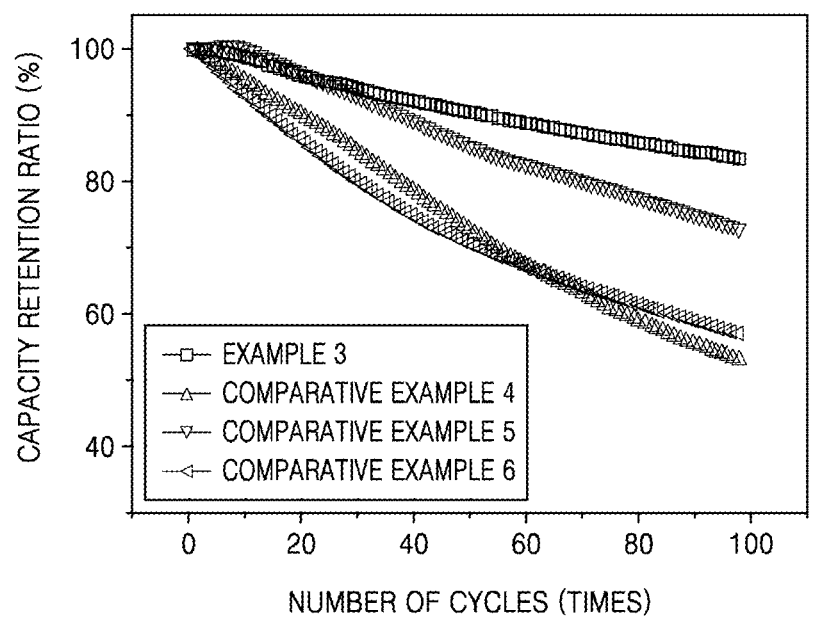
FIG. 8A is a graph of capacity retention (percent, %) versus number of cycles for the coin cells of Example 3 and Comparative Examples 4 to 6.
Figure 8B:
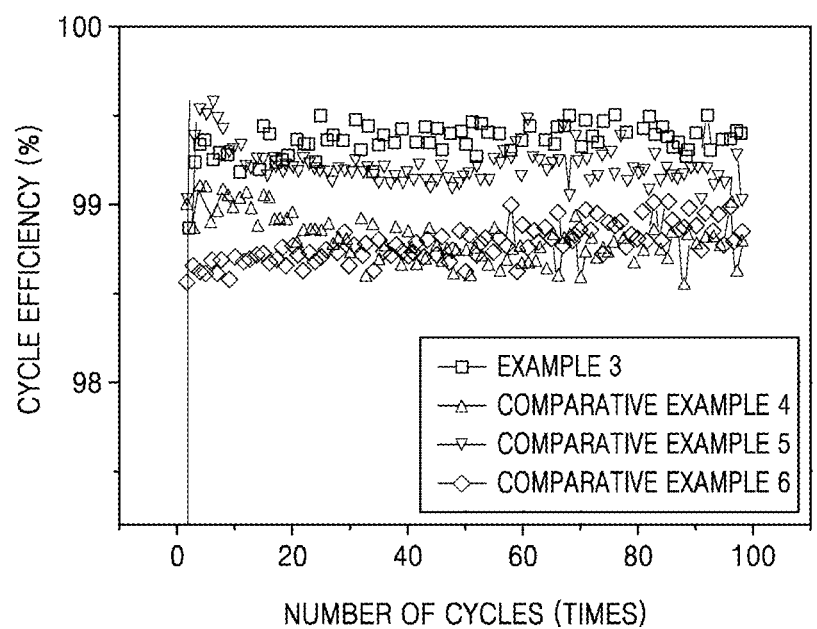
FIG. 8B is a graph of cycle efficiency versus the number of cycles for the coin cells of Example 3 and Comparative Examples 4 to 6.

Charge and discharge characteristics of the coin full cells of Example 3 and Comparative Examples 4 to 6 were evaluated under the following charging and discharging conditions: (Charging: 1.0C/Cutoff: 4.2V-0.01C, Discharging: 1.0C/Cutoff: 2.5V). The results of evaluating the charge and discharge characteristics are shown in FIGS. 8A and 8B and Table 1.

TABLE 1

| Example | Initial efficiency (%) | Lifespan (%) |
|---|---|---|
| Example 3 | 90.4 | 83.3 |
| Comparative Example 4 | 72.0 | 75.1 |
| Comparative Example 5 | 85 | 72.8 |
| Comparative Example 6 | 78.6 | 57.1 |

Referring to Table 1, the coin full cell of Example 3 was found to have an improved initial efficiency and an improved lifespan as compared with those of the coin full cells of Comparative Examples 4 to 6.
2) Examples 3 and 4, and Comparative Example 4

Charge and discharge characteristics of the coin full cells of Examples 3 and 4 and Comparative Example 4 were evaluated under the following charging and discharging conditions: (Charging: 1.0C/Cutoff: 4.2V-0.01C, Discharging: 1.0C/Cutoff: 2.5V). The results of evaluating the charge and discharge characteristics are shown in FIGS. 8C and 8D.

Figure 8C:
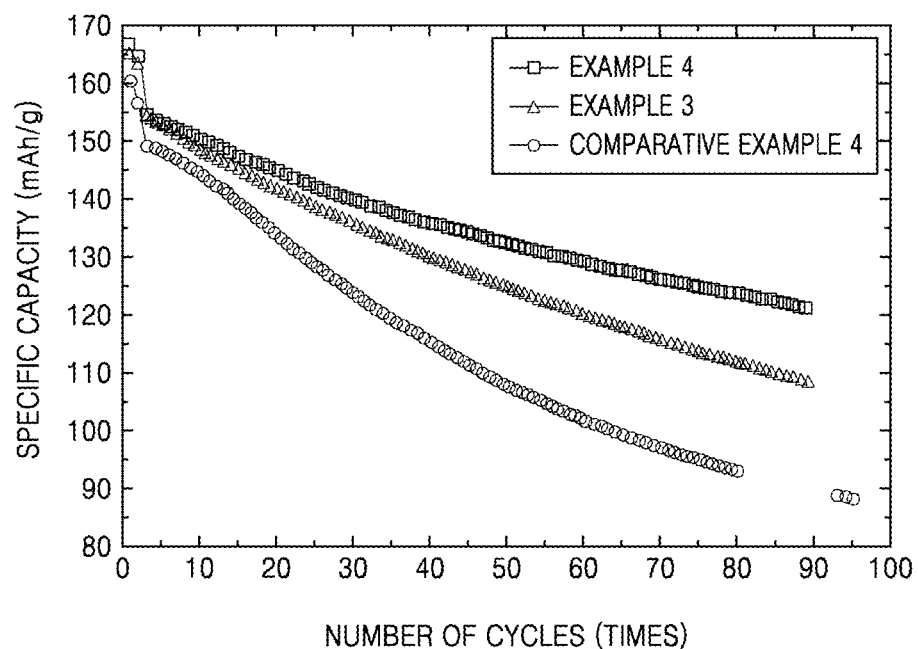
FIG. 8C is a graph of specific capacity (milliampere hours per gram, mAh/g) versus the number of cycles for the coin full cells of Examples 3 and 4 and Comparative Example 4.
Figure 8D:
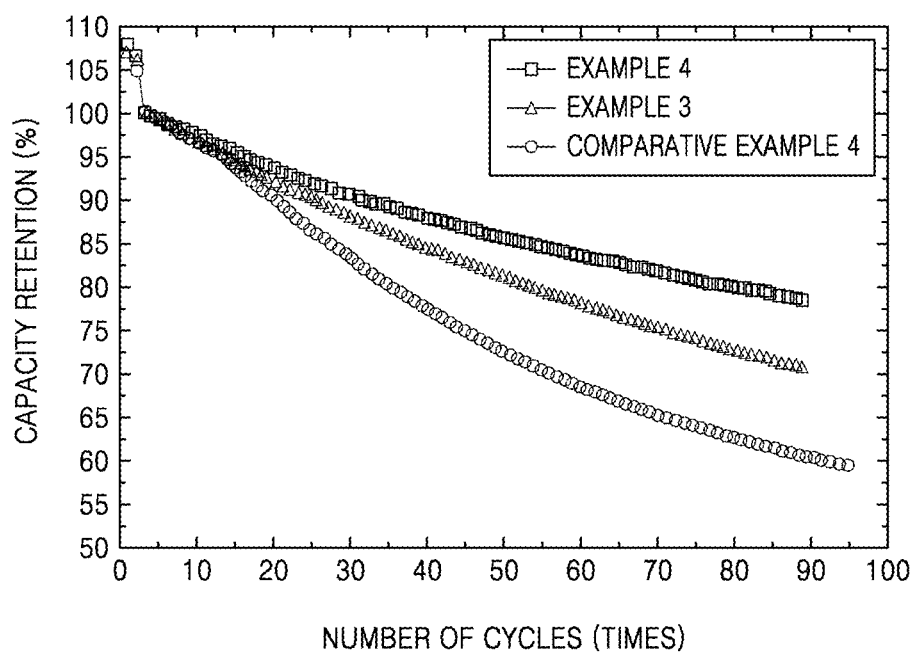
FIG. 8D is a graph of capacity retention (percent, %) versus the number of cycles for the coin full cells of Examples 3 and 4 and Comparative Example 4.
Figure 9A:
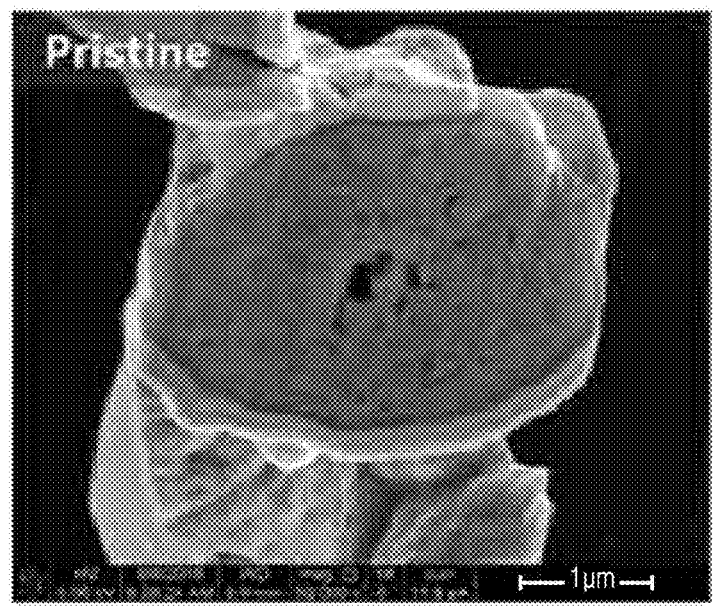
FIGS. 9A to 9D are SEM images of a negative active material of the coin full cell of Example 3 used to evaluate an expansion ratio.
Figure 9B:
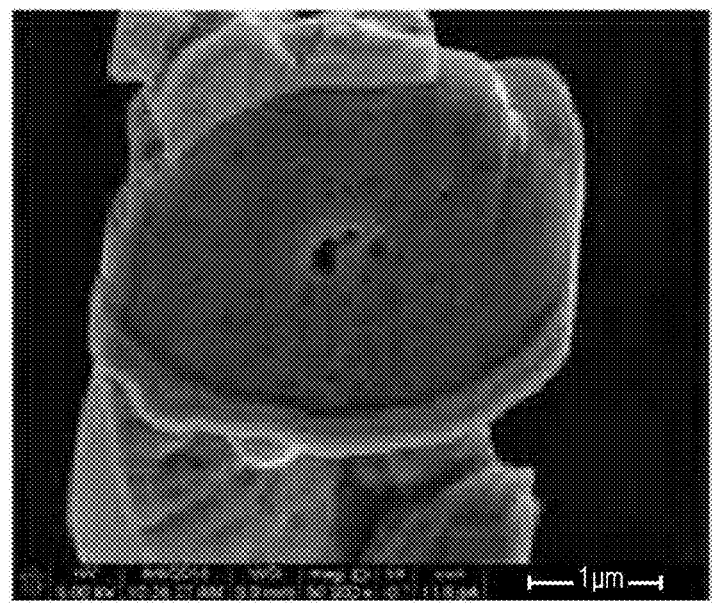
Figure 9C:
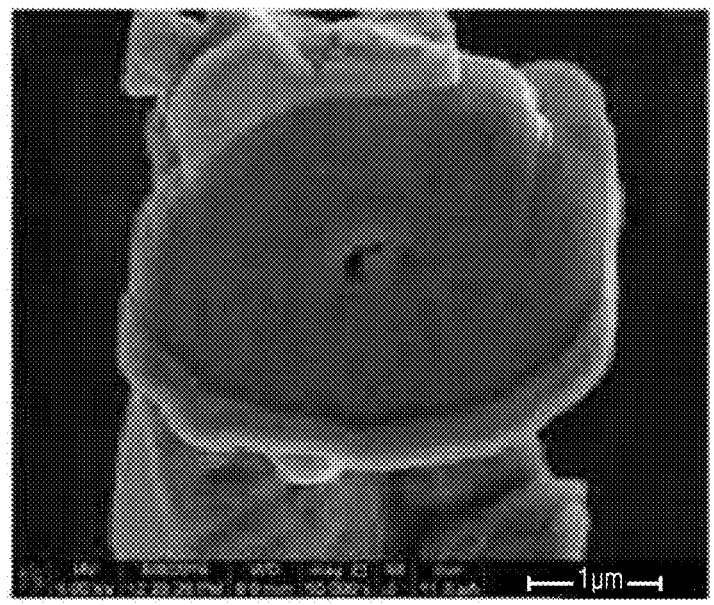
Figure 9D:
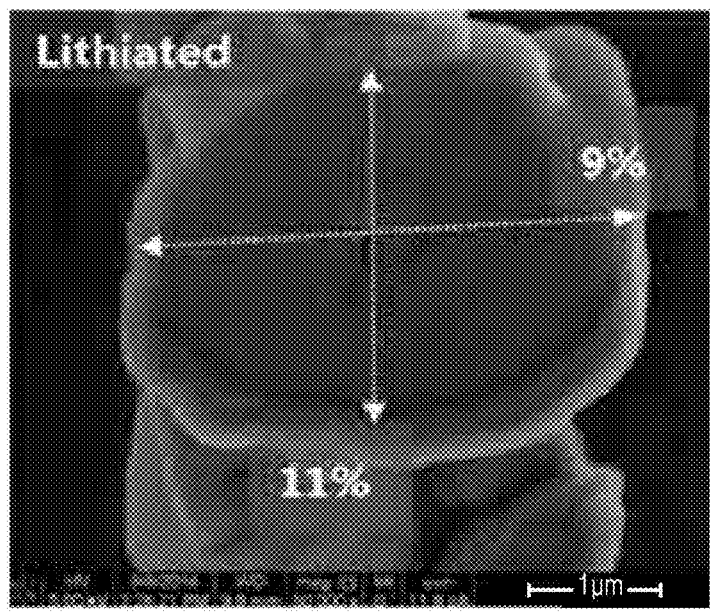
Figure 10A:
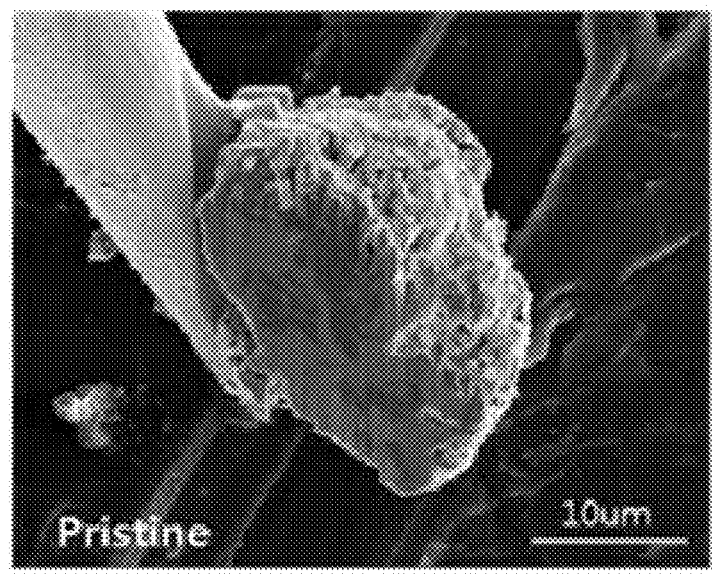
FIGS. 10A to 10D are SEM images of a negative active material of the coin full cell of Comparative Example 10 used to evaluate an expansion ratio.
Figure 10B:
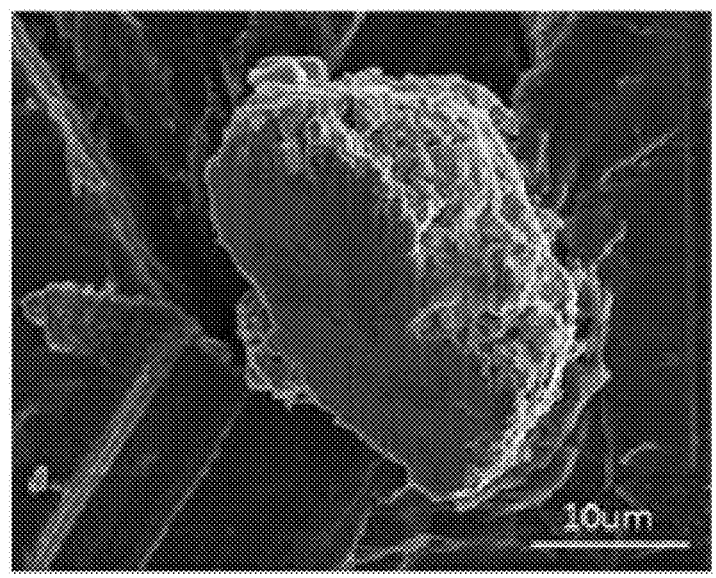
Figure 10C:
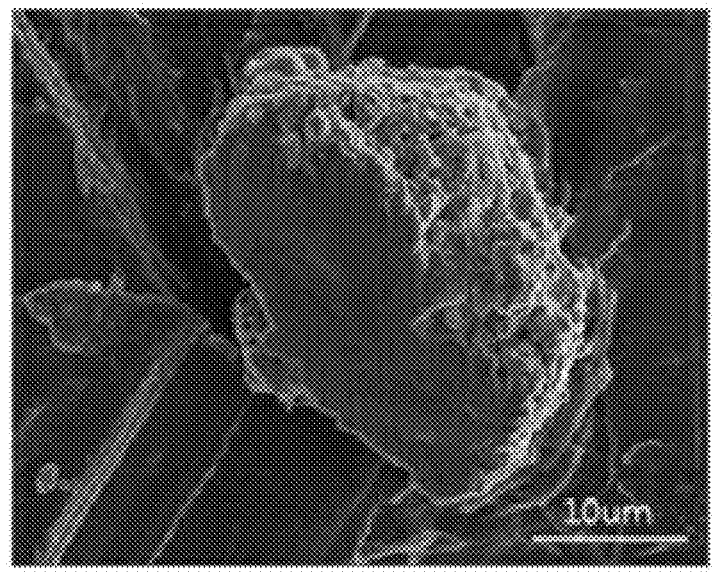
Figure 10D:
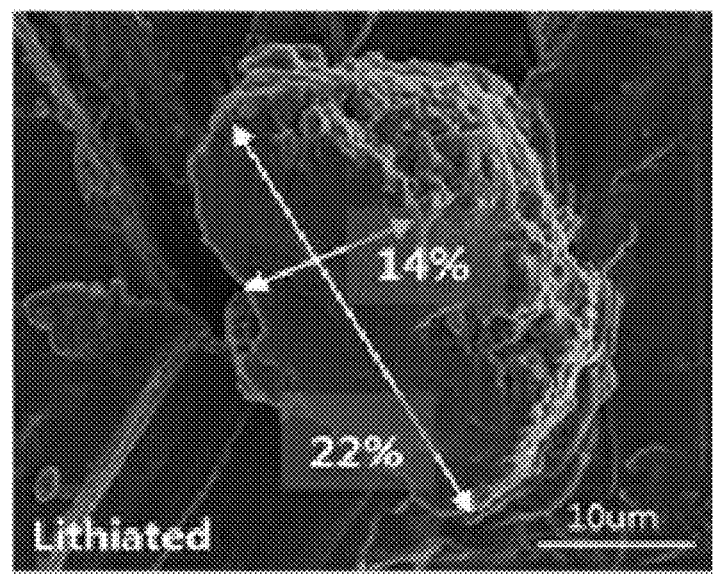

Referring to FIGS. 8C and 8D, each of the coin full cells of Examples 3 and 4 was found to have an improved specific capacity and an improved capacity retention as compared with those of the coin full cell of Comparative Example 4.

3) Examples 7, and Examples 8 to 11

Charge and discharge characteristics of the coin full cells of Examples 7, and 8 to 10 were evaluated in the same manner as the coin full cells of Example 3 and Comparative Examples 4 to 6.

As a result, the coin full cells of Examples 7, and 8 to 10 were found to have similar charge and discharge characteristics to those of the coin full cell of Example 3.

Evaluation Example 2: Conductivity Evaluation

The porous silicon composite cluster structure prepared in Example 1 was pulverized into powder, and was used to evaluate powder conductivity of the composite with a powder resistor at a load from about 4 kN to about 20 kN.

Figure 12A:
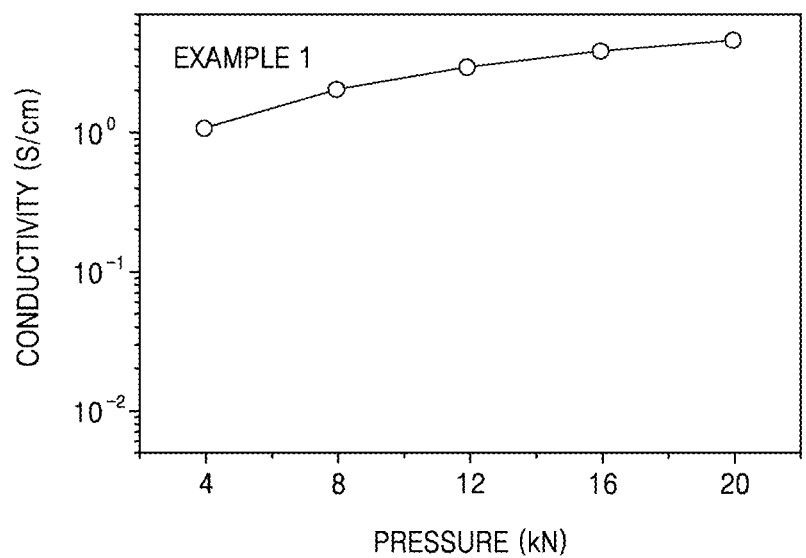
FIG. 12A is a graph of conductivity (Siemens per centimeter, S/cm) versus pressure of the porous silicon composite of Example 1.

The conductivity evaluation results are shown in FIG. 12A.

Referring to FIG. 12A, the porous silicon composite cluster structure of Example 1 was found to have good powder conductivity.

Evaluation Example 3: Charge-Discharge Characteristics (Rate Capability)

Figure 13A:
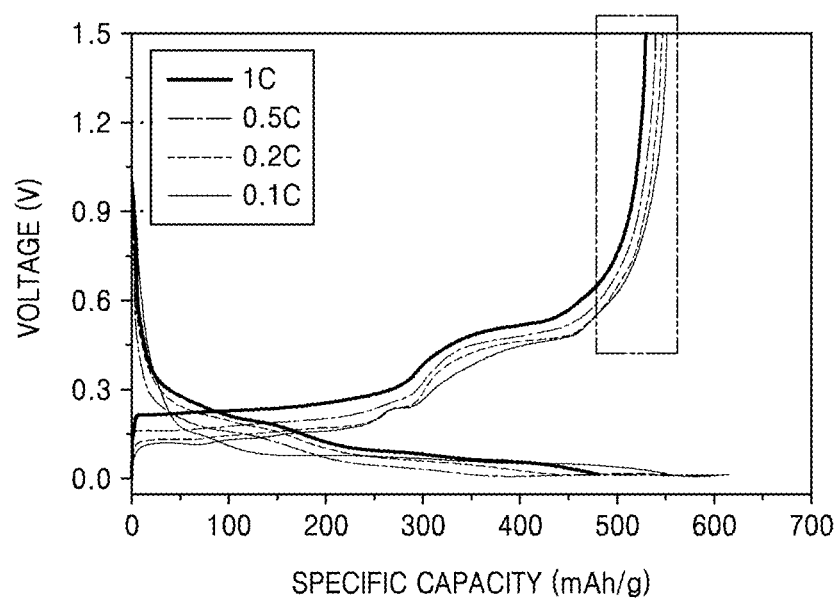
FIGS. 13A and 13B are graphs of voltage (V) versus to specific capacity (milliampere hours per gram, mAh/g) illustrating the rate capability of the coin halfcell of Example 5.
Figure 13B:
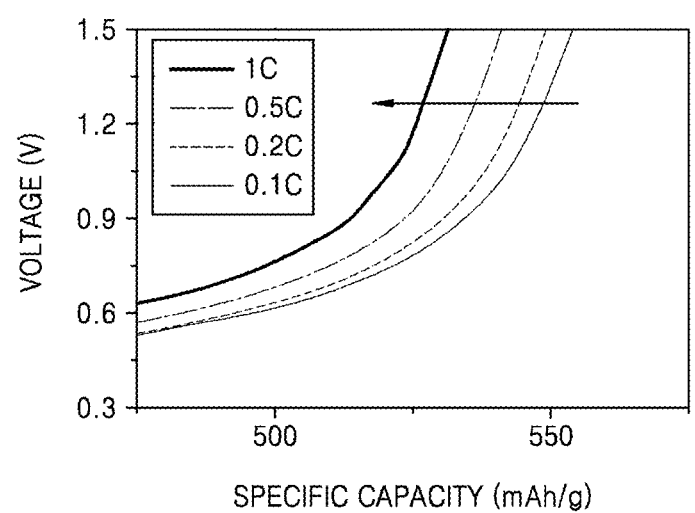

The coin half cell of Example 5 was charged with a constant current (0.1C) and constant voltage (0.01V, 0.01C cut-off), followed by a rest period for about 10 minutes, and discharging at a constant current (0.1C, 0.2C, 0.5C, or 1C) to a voltage of about 1.5V. That is, the discharge rate was periodically changed to 0.1C, 0.2C, 0.5C, and 1C at charge and discharge cycles to evaluate a rate capability of the coin full cell of Example 3. In particular, the discharge rate was maintained constant at 0.1C only at the $1^{st}$ to $3^{rd}$ charge and discharge cycles, and then every further charge/discharge cycle was performed at either 0.1C, 0.2C, 0.5C, or 1C. The resulting rate capability of the coin full cell of Example 3 is shown in FIGS. 13A and 13B. FIG. 13B is a magnified plot of a region from FIG. 13A. Referring to FIGS. 13A and 13B, the coin half cell of Example 5 was found to have good rate capability.

Evaluation Example 4: Expansion Ratio

1) Example 3 and Comparative Example 10

Figure 11:
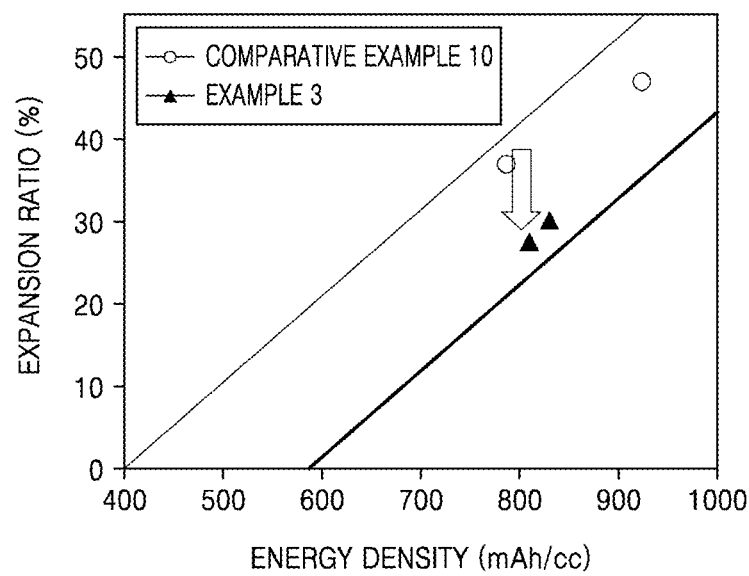
FIG. 11 is a graph of electrode expansion ratio (percent, %) versus energy density (milliampere hours per cubic centimeter, mAh/cc) for the coin full cell of Comparative Example 10.

The coin full cells of Example 3 and Comparative Example 10 were each charged under a constant current/constant voltage (CC/CV) condition, and in particular, charged at a constant current (CC) of about 0.1C until the voltage reached about 4.2V, and then at a constant voltage (CV) until the current reached 0.005C. After being left for about 20 minutes, each of the coin full cells was discharged at a constant current of 0.1C until the voltage reached 2.5V, thereby completing a 1st charge-discharge cycle. After being left for about 20 minutes, each of the coin full cells was fully charged at 0.2C, and then disassembled to measure an electrode expansion ratio in respect of a difference in electrode thickness between before and after the charging and discharging. The results are shown in FIGS. 9A to 9D, FIGS. 10A to 10D, and FIG. 11. FIGS. 9A to 9D are SEM images used for the expansion ratio evaluation of the coin full cell of Example 3. FIGS. 10A to 10D are SEM images used for the expansion ratio evaluation of the coin full cell of Comparative Example 10. FIG. 11 is a graph of negative electrode expansion ratio of the coin cell of Comparative Example 10 and Example 3.

Referring to FIGS. 9A to 11, the coin full cell of Example 3 was found to have an improved thickness expansion ratio, compared to that of the coin cell of Comparative Example 10.

2) Example 3 and Comparative Examples 4-5

The expansion ratio of the coin full cells of Example 3 and Comparative Example 10 were evaluated in the same manner as the coin full cells of Example 3 and Comparative Example 10. The results of evaluating the expansion ration are shown in Table 2.

TABLE 2

| Example | Expansion ratio (%) |
|---|---|
| Example 3 | 27 |
| Comparative Example 4 | 45 |
| Comparative Example 5 | 45 |

Referring to Table 2, the coin full cell of Example 3 was found to have an reduced expansion ratio as compared with those of the coin full cells of Comparative Examples 4 and 5.

Evaluation Example 5: Scanning Electron Microscopy (SEM) after Charging and Discharging Charge and discharge characteristics of the coin full cell of Example 3 were evaluated under the following charging and discharging conditions: (Charging: 1.0C/Cutoff: 4.2V-0.01C, Discharging: 1.0C/Cutoff: 2.5V)

Figure 12B:
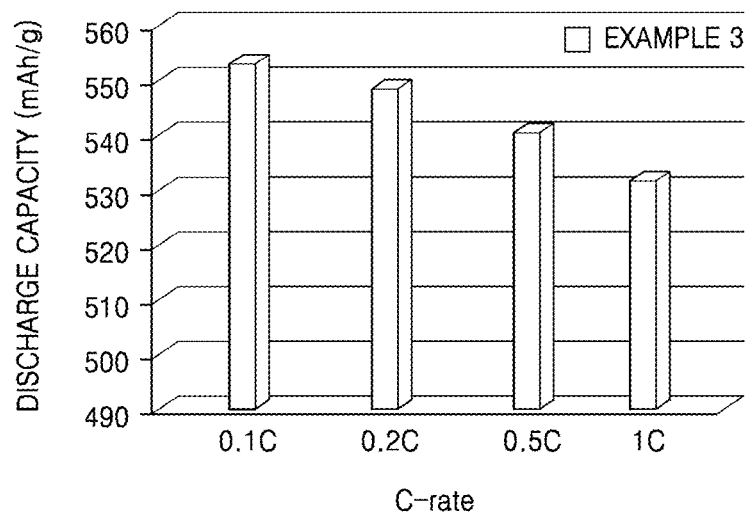
FIG. 12B is a graph illustrating the rate capability of the coin full cell of Example 3 and shows the discharge capacity (milliampere hours per gram, mAh/g) at various C rates.

After a 100th cycle of charging and discharging, a surface and a cross-section of the negative active material in the negative electrode were observed using scanning electron microscopy (SEM). The surface analysis results of the negative active material are shown in FIGS. 12A and 12B.

Referring to FIGS. 12A to 12E, the coin full cell of Example 3 was found to maintain a secondary particle structure after the 100th cycle of charging and discharging. Accordingly, a battery having a low expansion ratio and improved durability may be manufactured using a structurally stable negative active material such as that used in the coin full cell of Example 3, which remains stable even after repeated cycles of charging and discharging.

Evaluation Example 6: Scanning Electron Microscopy/Transmission Electron Microscopy (SEM/TEM)

The porous silicon composite cluster prepared in Preparation Example 1 and the porous silicon composite cluster structure of Example 1 were analyzed by SEM (FE-SEM, available from Hitachi SU 8030) and transmission electron microscopy (TEM, Titan cubed 60-300, available from FEI). The results are shown in FIGS. 3A to 3E.

Figure 3A:
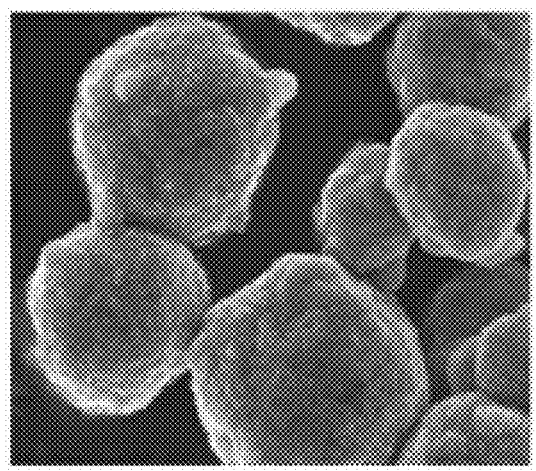
FIGS. 3A and 3D are scanning electron microscopic (SEM) and transmission electron microscopic (TEM) images of a porous silicon composite cluster prepared in Preparation Example 1, respectively.
Figure 3B:
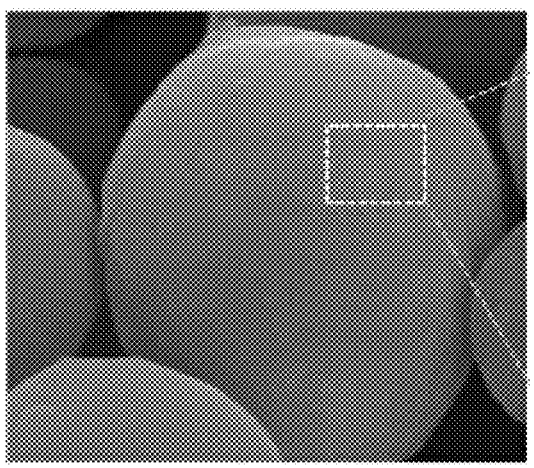
FIGS. 3B and 3C, and are SEM images of a porous silicon composite cluster structure of Example 1.
Figure 3C:
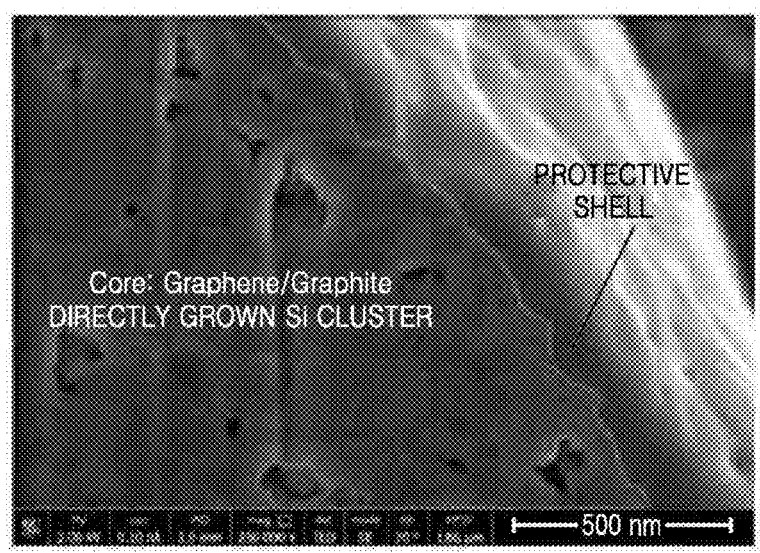
Figure 3D:
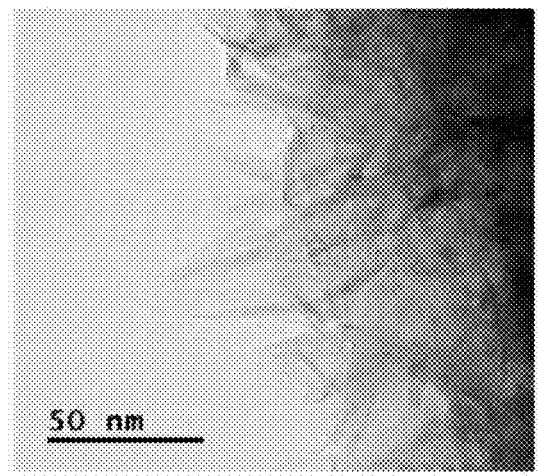

FIGS. 3A and 3D are SEM and TEM images of the porous silicon composite cluster prepared in Preparation Example 1, respectively. As shown in FIG. 3D, the porous silicon composite cluster was found to include carbon in the form of flakes on the surface of silicon in the core thereof.

Figure 3E:
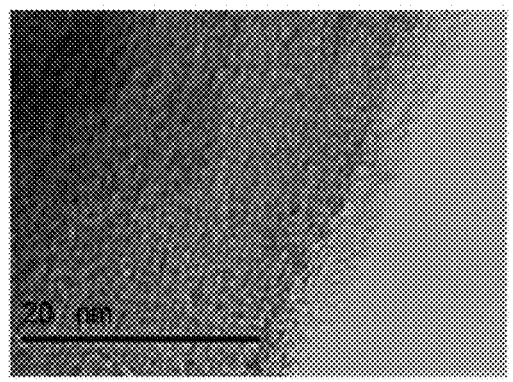
FIG. 3E is TEM images of a porous silicon composite cluster structure of Example 1.

FIGS. 3B and 3C are SEM images of the porous silicon composite cluster structure of Example 1, and FIG. 3E is SEM image of the porous silicon composite cluster structure of Example 1. FIG. 3C is an SEM image of a cross-section of the porous silicon composite of Example 1, and FIG. 3E is a magnified TEM image of a region of the boundary between the core and the shell.

Referring to FIGS. 3B, 3C, and 3E, it was found that the core of the porous silicon composite cluster structure of Example 1 had a porous structure with carbon flakes, and the shell had a layer including amorphous carbon. The layer had a thickness of about 20 nm.

Evaluation Example 7: SEM

The porous silicon composite cluster structures of Examples 1 and 2, and the structure of Comparative Example 4a were analyzed by SEM. The results are shown in FIGS. 4A to 4E.

Figure 4A:
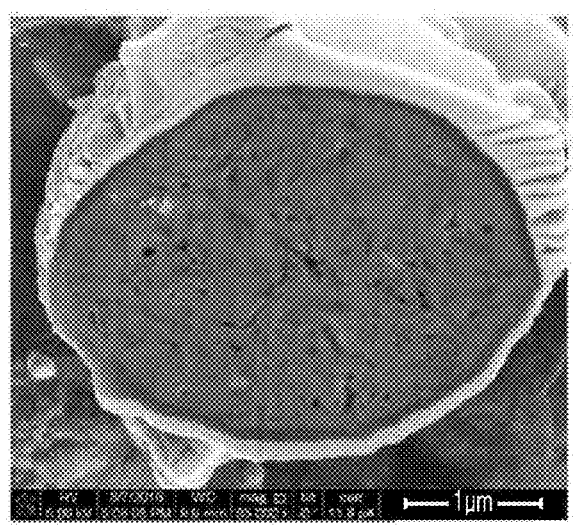
FIG. 4A is an SEM image of a cross-section of the porous silicon composite cluster structure of Example 1.
Figure 4B:
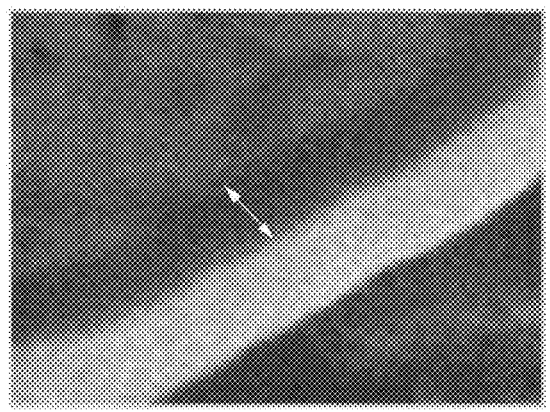
FIGS. 4B and 4D are magnified SEM images of a region of the boundary between the core and the shell in the porous silicon composite cluster structure of FIG. 4A.

FIG. 4A is an SEM image of a cross-section of the porous silicon composite cluster structure of Example 1. FIGS. 4B and 4D are magnified SEM images showing regions of the boundary between the core and the shell in the porous silicon composite cluster structure of FIG. 4A.

Figure 4C:
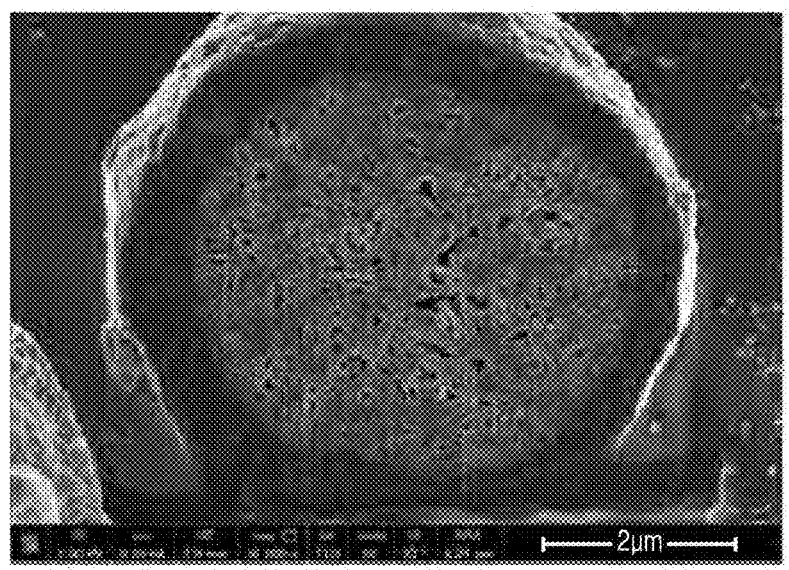
FIG. 4C is an SEM image of a cross-section of a porous silicon composite cluster structure of Example 2.
Figure 4D:
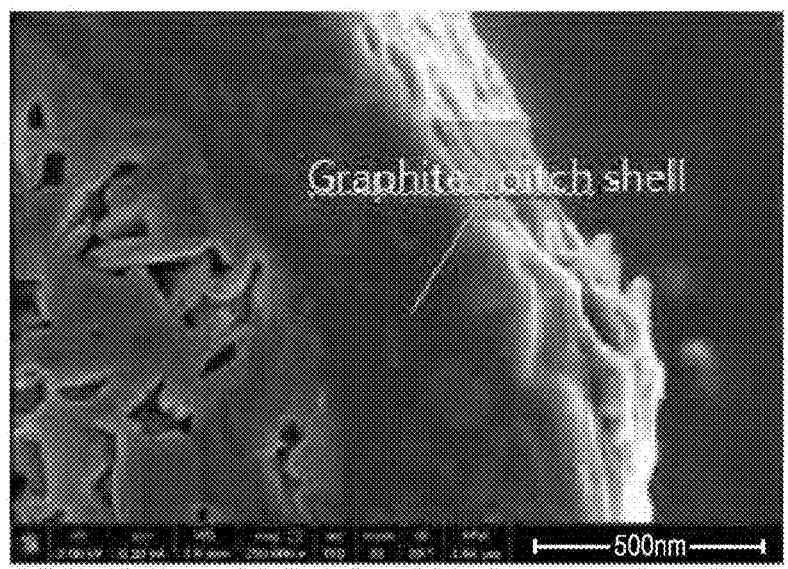

FIG. 4C is an SEM image of a cross-section of the porous silicon composite cluster structure of Example 2.

Referring to FIGS. 4A to 4C, an amorphous carbon layer of pitch carbon is on the core of the porous silicon composite cluster, and may serve as a protective shell.

Figure 4E:
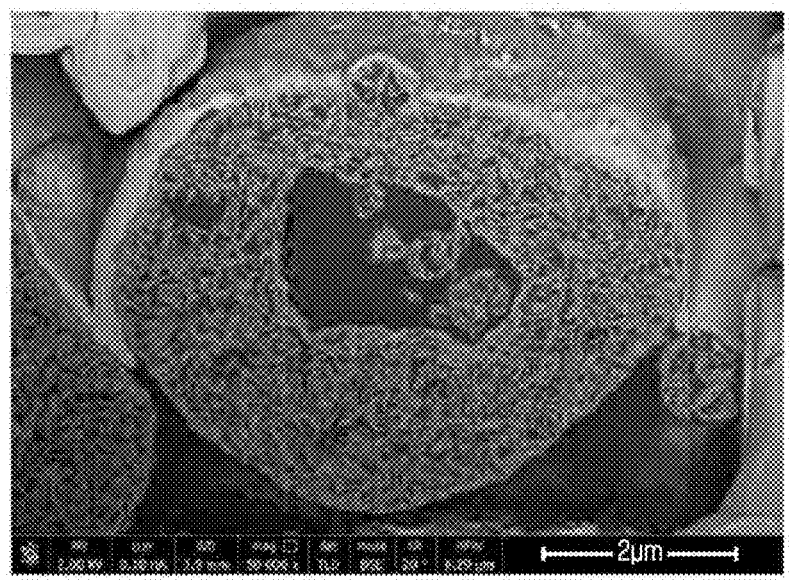

FIG. 4E is an SEM image of the structure of Comparative Example 4a.

The porous silicon composite cluster structures of Example 1 and 2 was found to have a structure in which a carbonaceous layer including amorphous carbon from coal tar pitch carbon and crystalline carbon from graphite was on the core of particles of the porous silicon composite cluster.

Referring to FIG. 4E, unlike the porous silicon composite cluster structure of Example 2, the structure of Comparative Example 4a was found to have a structure in which internal pores (voids) are filled with, for example, coal tar pitch carbon, indicating that a target porous structure may not be obtained by a wet coating process which may cause the internal pores to become clogged.

Evaluation Example 8: X-Ray Diffraction

The porous silicon composite cluster structures of Examples 1 and 2 were analyzed by X-ray diffraction using a Rigaku RINT2200HF+ diffractometer with CuKα radiation (1.540598 Å). The results of the X-ray diffraction analysis are shown in FIGS. 5A and 5B.

Figure 5A:
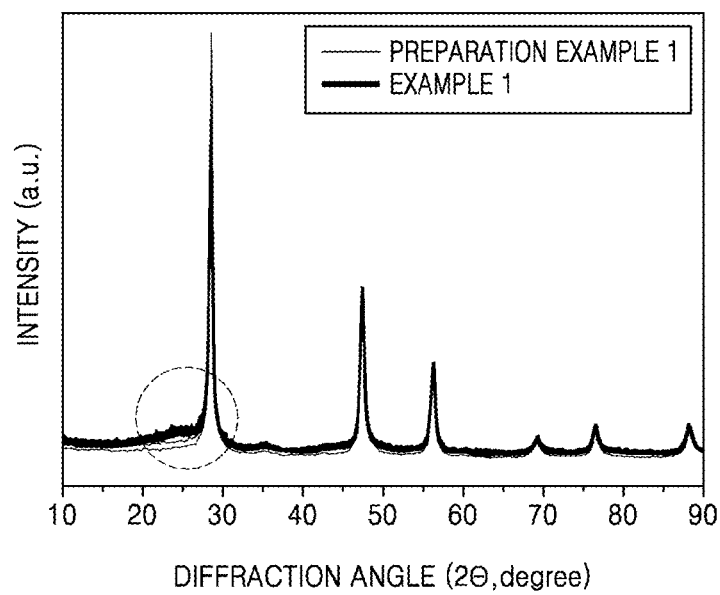
FIG. 5A is a graph of intensity (arbitrary units) versus diffraction angle (degrees two-theta, 2θ) illustrating results of X-ray diffraction of the porous silicon composite cluster of preparation example 1 and the porous silicon composite cluster structure of Example 1.
Figure 5B:
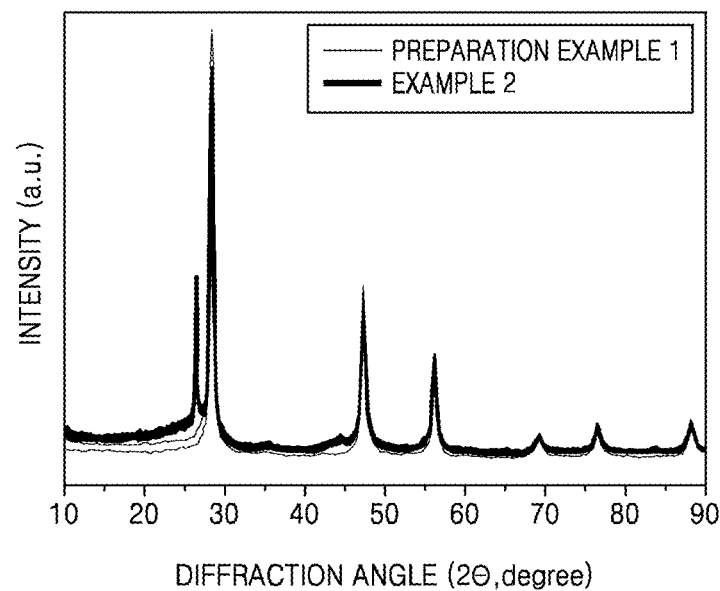
FIG. 5B is a graph of intensity (arbitrary units) versus diffraction angle (degrees two-theta, 2θ) illustrating results of X-ray diffraction of the porous silicon composite cluster of preparation example 1 and the porous silicon composite cluster structure of Example 2.

FIG. 5A is a graph of intensity (arbitrary units) versus diffraction angle (degrees two-theta, 2θ) illustrating results of X-ray diffraction of the porous silicon composite cluster of preparation example 1 and the porous silicon composite cluster structure of Example 1, and FIG. 5B is a graph of intensity (arbitrary units) versus diffraction angle (degrees two-theta, 2θ) illustrating results of X-ray diffraction of the porous silicon composite cluster of preparation example 1 and the porous silicon composite cluster structure of Example 2.

Referring to FIGS. 5A and 5B, peaks associated with carbon in the carbonaceous layer including pitch carbon appear at a Bragg angle 2θ of about 30°. This peak may be used, together with a peak associated with carbon in the porous silicon composite cluster of the porous silicon composite cluster structure, to identify a ratio of carbon in the core to carbon in the shell of the composite cluster structure.

Evaluation Example 9: Scanning Electron Microscopy/Energy Dispersive Spectroscopy (SEM/EDS)

Charge and discharge characteristics of the coin cell of Example 3 manufactured using the porous silicon composite of Example 1 as a negative active material were evaluated under the following charging and discharging conditions: (Charging: 1.0C/Cutoff: 4.2V-0.01C, Discharging: 1.0C/Cutoff: 2.5V)

After a 100th cycle of charging and discharging, a surface of the negative active material in the negative electrode was analyzed by scanning electron microscopy/energy dispersive spectroscopy (SEM/EDS).

Figure 6A:
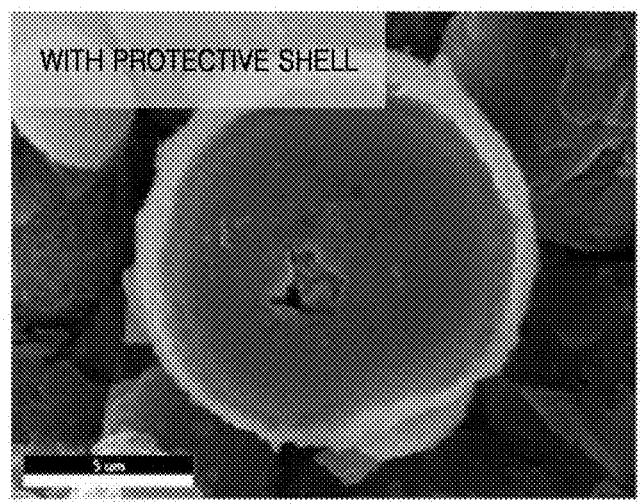
FIGS. 6A to 6C are the results of scanning electron microscopy/energy dispersive spectroscopy (SEM/EDS) analysis of a surface of a negative active material including the porous silicon composite cluster structure of Example 1.
Figure 6B:
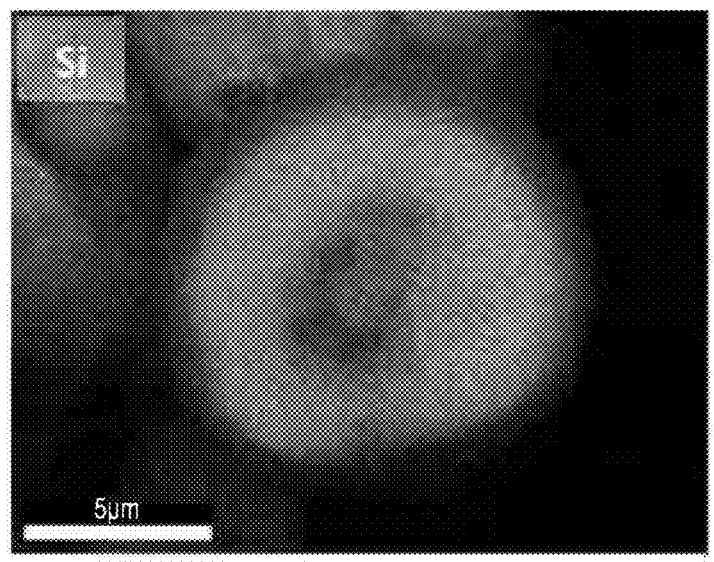
Figure 6C:
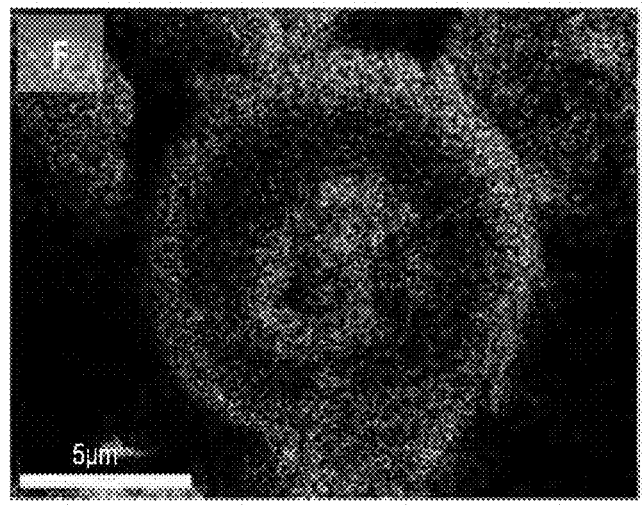
Figure 7A:
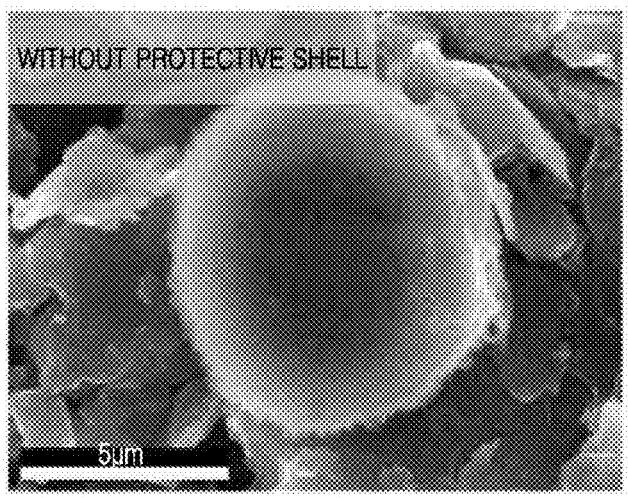
FIGS. 7A to 7C are the results of SEM/EDS analysis of a surface of a negative active material including the porous silicon composite cluster of Preparation Example 1.
Figure 7B:
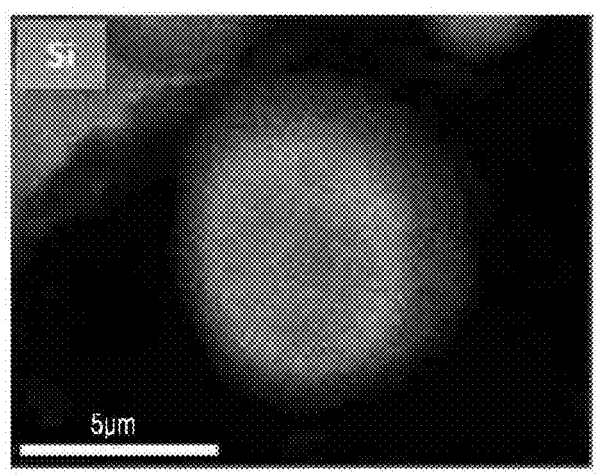
Figure 7C:
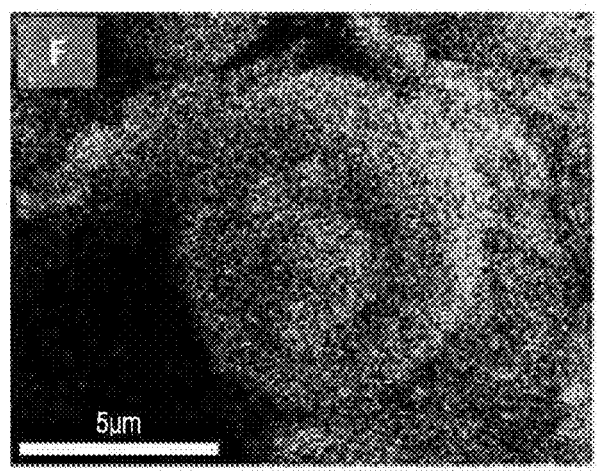

The surface analysis results of the negative active material using the porous silicon composite cluster structure of Example 1 are shown in FIGS. 6A to 6C. The surface analysis results of the negative active material using the porous silicon composite cluster Preparation Example 1 are shown in FIGS. 7A to 7C.

Referring to FIGS. 6A to 6C and FIGS. 7A to 7C, the negative active material using the porous silicon composite cluster structure of Example 1 was found to lead to reduced permeation of a liquid electrolyte even with repeated charging and discharging cycles, indicating that the porous silicon composite cluster structure of Example 1 may have improved chemical structural stability, as compared with the porous silicon composite cluster of Preparation Example 1 without a carbonaceous layer.

Evaluation Example 10: Charge-Discharge Characteristics (Capacity Retention)

Charge and discharge characteristics of the coin cells of Example 3 and Comparative Example 11 were evaluated under the following charging and discharging conditions: (Charging: 1.0C/Cutoff: 4.2V-0.01C, Discharging: 1.0C/Cutoff: 2.5V). The evaluation results are shown in FIGS. 14C and 14D.

Figure 14A:
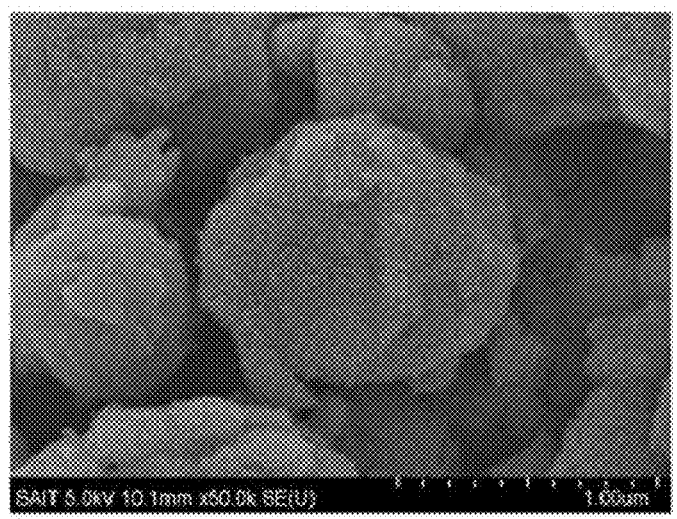
FIGS. 14A and 14B are SEM images of the porous silicon composite cluster of Preparation Example 1 and the porous silicon composite cluster structure of Example 1, respectively.
Figure 14B:
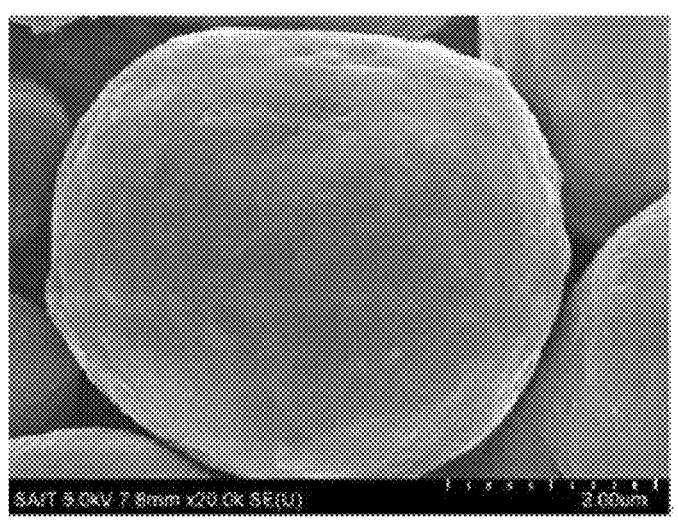
Figure 14C:
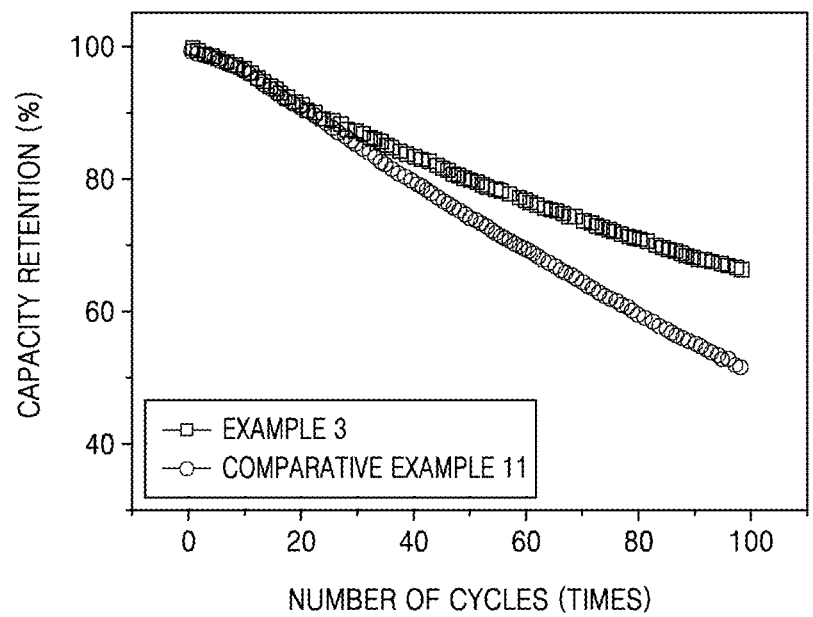
FIG. 14C is a graph of capacity retention (percent, %) versus number of cycles for the coin full cells of Example 3 and Comparative Example 11.
Figure 14D:
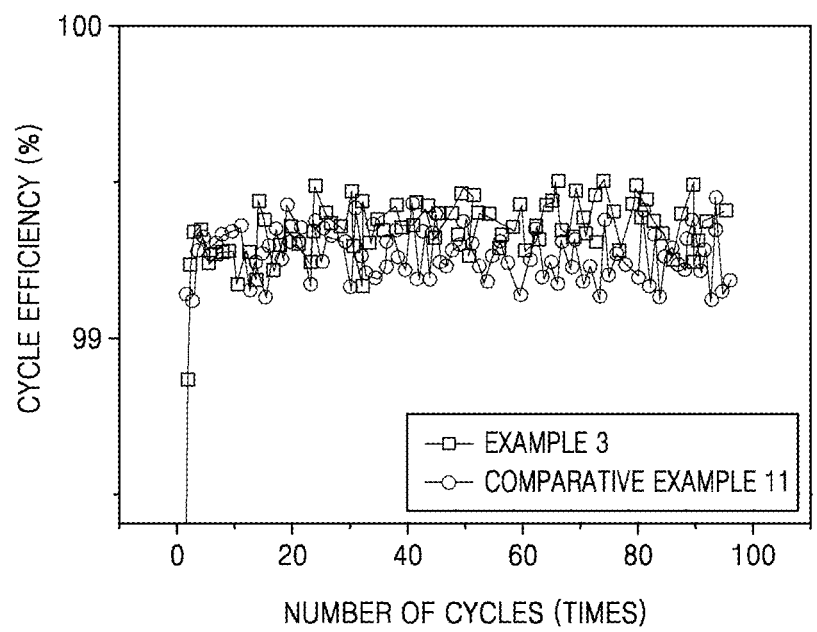
FIG. 14D is a graph of cycle efficiency (%) versus to the number of charge/discharge cycles of the coin full cells of Example 3 and Comparative Example 11.

Referring to FIGS. 14C and 14D, the coin cell of Example 3 was found to have an improved capacity retention and improved cycle efficiency, as compared with those of the coin cells of Comparative Example 11.

Evaluation Example 11: SEM

The porous silicon composite cluster of Preparation Example 1 and the porous silicon composite cluster structure of Example 1 were analyzed by SEM. The analysis results are shown in FIGS. 14A and 14B.

Referring to FIG. 14B, the porous silicon composite cluster structure of Example 1 was found to have a homogeneous layer on the surface of the core structure which is shown in FIG. 14A.

In the porous silicon composite cluster structure of Example 1, the highly homogeneous carbonaceous layer was formed on the core surface by dry milling.

Evaluation Example 12: High-Resolution Transmission Electron Microscopy/Selected Area-Electron Diffraction (HRTEM/SAED)

Figure 15A:
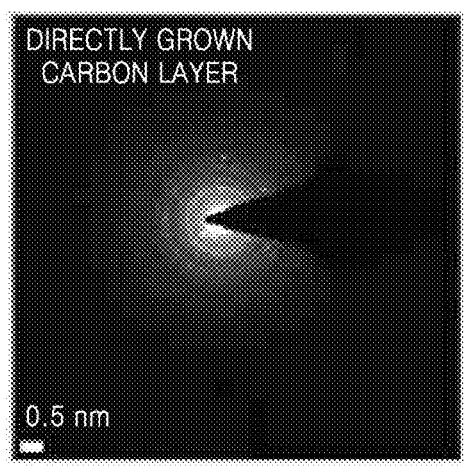
FIGS. 15A and 15B are high-resolution transmission electron microscopy/selected area-electron diffraction (HR-TEM/SAED) analysis results of the porous silicon composite cluster structure of Example 1.
Figure 15B:
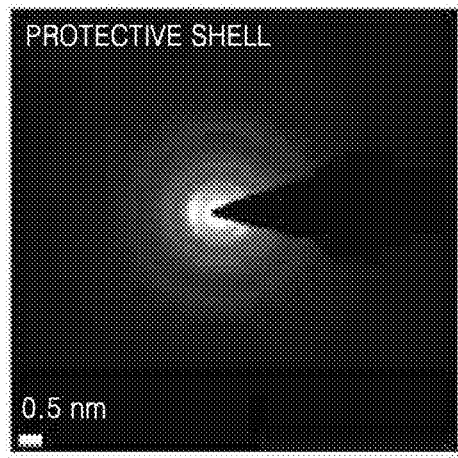

The porous silicon composite of Example 1 was analyzed by high-resolution transmission electron microscopy/selected area-electron diffraction (HRTEM/SAED) using a JEOLI (JEM 2100F) microscope at a 100 kV applied voltage. The analysis results are shown in FIGS. 15A and 15B. FIGS. 15A and 15B are HRTEM/SAED analysis results of core and shell regions, respectively, in the porous silicon composite cluster structure of Example 1.

Referring to FIGS. 15A and 15B, from SAED patterns of the core and shell regions, it was found that carbon flakes in the core regions may have crystalline characteristics and the shell region may have amorphous characteristics.

As described above, according to the disclosed embodiments, when used as an electrode active material, a porous silicon composite cluster structure may form a network between silicon particles to thus suppress expansion of the electrode during charging and discharging, and may improve initial efficiency and volume energy density of the lithium battery. The porous silicon composite may also form a conductive, durable protective layer for silicon, and thus may improve durability of the lithium battery against charging and discharging It should be understood that embodiments described herein should be considered in a descriptive sense only and not for purposes of limitation. Descriptions of features, advantages, or aspects within each embodiment should be considered as available for other similar features, advantages or aspects in other embodiments.

While an embodiment has been described with reference to the figures, it will be understood by those of ordinary skill in the art that various changes in form and details may be made therein without departing from the spirit and scope as defined by the following claims.

What is claimed is:

1. A porous silicon composite cluster structure comprising:
   a porous silicon composite cluster comprising a porous silicon composite secondary particle and a second carbon flake on at least one surface of the porous silicon composite secondary particle; and
   a carbonaceous layer on the porous silicon composite cluster, the carbonaceous layer comprising amorphous carbon,
   wherein the porous silicon composite secondary particle comprises an aggregate of two or more silicon primary particles,
   each of the two or more silicon primary particles comprises silicon, a silicon suboxide of the formula $SiO_x$, wherein $0<x<2$, coated on the silicon, and a first carbon flake coated on the silicon suboxide,
   the silicon suboxide is in a form of a film, a matrix, or a combination thereof, and
   the first carbon flake and the second carbon flake are each independently present in a form of a film, a particle, a matrix, or a combination thereof,
   wherein the first carbon flake is a first graphene flake, and
   wherein the first graphene flake is
      separated from the silicon suboxide by a distance of about 10 nanometers or less,
      comprises 1 to about 30 graphene layers having a total thickness of about 0.3 nanometers to about 1,000 nanometers.

2. The porous silicon composite cluster structure of claim 1, wherein the second carbon flake is directly on the surface of the porous silicon secondary particle.

3. The porous silicon composite cluster structure of claim 1, wherein the first carbon flake and the second carbon flake each independently comprise graphene, graphite, carbon fibers, graphitic carbon, or graphene oxide.

4. The porous silicon composite cluster structure of claim 1, wherein the amorphous carbon of the carbonaceous layer comprises pitch carbon, soft carbon, hard carbon, a mesophase pitch carbonization product, a sintered coke, carbon fiber, or a combination thereof.

5. The porous silicon composite cluster structure of claim 1, wherein the carbonaceous layer further comprises a crystalline carbon.

6. The porous silicon composite cluster structure of claim 4, wherein the crystalline carbon comprises natural graphite, artificial graphite, graphene, a fullerene, carbon nanotubes, or a combination thereof.

7. The porous silicon composite cluster structure of claim 1, wherein a ratio of a total weight of the first carbon flake and the second carbon flake of the porous silicon secondary particle to a total weight of the carbonaceous layer is in a range of about 30:1 to about 1:3 by weight.

8. The porous silicon composite cluster structure of claim 1, wherein the carbonaceous layer comprises a first carbonaceous layer comprising the amorphous carbon, and a second carbonaceous layer comprising a crystalline carbon.

9. The porous silicon composite cluster structure of claim 1, wherein the carbonaceous layer is a non-porous continuous coating and has a thickness in a range of about 1 nanometer to about 5000 nanometers.

10. The porous silicon composite cluster structure of claim 1, wherein a ratio of a diameter of the porous silicon secondary particle to a diameter of the porous silicon composite cluster is in a range of about 1:1.0001 to about 1:30.

11. The porous silicon composite cluster structure of claim 1, wherein a total amount of the first carbon flake and the second carbon flake in the porous silicon composite is in a range of about 0.1 part to about 2,000 parts by weight, based on 100 parts by weight of the silicon.

12. The porous silicon composite cluster structure of claim 1,
    wherein the second carbon flake of the porous silicon composite secondary particle is a second graphene flake,
    wherein the first graphane flake is oriented at an angle of about 0° to about 90° with respect to a major axis of the silicon, and
    wherein the second graphene flake is
       separated from the silicon suboxide by a distance of about 1000 nanometers or less,
       comprises 1 to about 30 graphene layers having a total thickness of about 0.3 nanometers to about 1,000 nanometers, and
       is oriented at an angle of about 0° to about 90° with respect to a major axis of the silicon.

13. The porous silicon composite cluster structure of claim 1, wherein the silicon suboxide has a thickness of about 30 micrometers or less.

14. The porous silicon composite cluster structure of claim 1, wherein the silicon is in a form of a sphere, a nanowire, a needle, a rod, a particle, a nanotube, a nanorod, a wafer, a nanoribbon, or a combination thereof.

15. The porous silicon composite of claim 1, wherein the porous silicon secondary particle has an average particle diameter of about 200 nanometers to about 50 micrometers, a specific surface area of about 0.1 square meter per gram to about 100 square meters per gram, and a density of about 0.1 gram per cubic centimeter to about 2.8 grams per cubic centimeter.

16. The porous silicon composite cluster structure of claim 1, wherein the silicon of the silicon primary particles has an average particle diameter of about 10 nanometers to about 30 micrometers.

17. A carbon composite comprising:
    the porous silicon composite cluster structure of claim 1; and
    a carbonaceous material.

18. An electrode comprising the porous silicon composite cluster structure of claim 1 or comprising a carbon composite which comprises the porous silicon composite cluster structure of claim 1 and a carbonaceous material.

19. The electrode of claim 18, wherein the carbonaceous material comprises graphene, graphite, fullerene, carbon fiber, graphitic carbon, carbon nanotube, or a combination thereof, and
   wherein an amount of the carbonaceous material is about 0.001 to about 99.999 parts by weight, based on 100 parts by weight of the carbon composite.

20. A lithium battery comprising the electrode of claim 18.

21. A porous silicon composite cluster structure comprising:
   a porous silicon composite cluster comprising a porous silicon composite secondary particle and
   a second carbon flake on at least one surface of the porous silicon composite secondary particle; and
   a carbonaceous layer on the porous silicon composite cluster, the carbonaceous layer comprising amorphous carbon,
   wherein the porous silicon composite secondary particle comprises an aggregate of two or more silicon primary particles, wherein
      each of the two or more silicon primary particles comprises silicon, a silicon suboxide of the formula $SiO_x$, wherein $0<x<2$, coated on the silicon, and a first carbon flake coated on the silicon suboxide, and
   the silicon suboxide is in a form of a film, a matrix, or a combination thereof, and
      wherein the first carbon flake and the second carbon flake are each independently present in a form of a film, a particle, a matrix, or a combination thereof, and
      wherein the second carbon flake of the porous silicon composite secondary particle is a second graphene flake, and wherein the second graphene flake is separated from the silicon suboxide by a distance of about 1000 nanometers or less, and comprises 1 to about 30 graphene layers having a total thickness of about 0.3 nanometers to about 1,000 nanometers.

22. The porous silicon composite cluster structure of claim 21, wherein the second graphene flake is oriented at an angle of about 0° to about 90° with respect to a major axis of the silicon.

23. A carbon composite comprising:
   the porous silicon composite cluster structure of claim 21; and
   a carbonaceous material.

24. An electrode comprising the porous silicon composite cluster structure of claim 21 or comprising a carbon composite which comprises the porous silicon composite cluster structure of claim 21 and a carbonaceous material.

25. The electrode of claim 24, wherein the carbonaceous material comprises graphene, graphite, fullerene, carbon fiber, graphitic carbon, carbon nanotube, or a combination thereof, and
   wherein an amount of the carbonaceous material is about 0.001 to about 99.999 parts by weight, based on 100 parts by weight of the carbon composite.

26. A lithium battery comprising the electrode of claim 24.

27. A porous silicon composite cluster structure comprising:
   a porous silicon composite cluster comprising a porous silicon composite secondary particle and a second carbon flake on at least one surface of the porous silicon composite secondary particle; and
   a carbonaceous layer on the porous silicon composite cluster, the carbonaceous layer comprising amorphous carbon,
   wherein the porous silicon composite secondary particle comprises an aggregate of two or more silicon primary particles, wherein
      each of the two or more silicon primary particles comprises silicon, a silicon suboxide of the formula $SiOx$, wherein $0<x<2$, coated on the silicon, and a first carbon flake coated on the silicon suboxide, and
      the silicon suboxide is in a form of a film, a matrix, or a combination thereof, and
   wherein the first carbon flake and the second carbon flake are each independently present in a form of a film, a particle, a matrix, or a combination thereof,
   wherein a ratio of a total weight of the first carbon flake and the second carbon flake of the porous silicon secondary particle to a total weight of the carbonaceous layer is in a range of about 10:1 to about 1:0.9 by weight.

28. The porous silicon composite cluster structure of claim 27, wherein the carbonaceous layer further comprises a crystalline carbon, and the crystalline carbon comprises natural graphite, artificial graphite, graphene, a fullerene, carbon nanotubes, or a combination thereof.

29. The porous silicon composite cluster structure of claim 27, wherein the carbonaceous layer comprises a first carbonaceous layer comprising the amorphous carbon, and a second carbonaceous layer comprising a crystalline carbon.

30. The porous silicon composite cluster structure of claim 27, wherein the carbonaceous layer is a non-porous continuous coating and has a thickness in a range of about 1 nanometer to about 5000 nanometers.

31. The porous silicon composite cluster structure of claim 27, wherein a ratio of a total weight of the first carbon flake and the second carbon flake of the porous silicon secondary particle to a total weight of the carbonaceous layer is in a range of about 6:4 to about 1:0.9 by weight.

32. A carbon composite comprising:
   the porous silicon composite cluster structure of claim 27; and
   a carbonaceous material.

33. An electrode comprising the porous silicon composite cluster structure of claim 27 or comprising a carbon composite which comprises the porous silicon composite cluster structure of claim 27 and a carbonaceous material.

34. The electrode of claim 33,
   wherein the carbonaceous material comprises graphene, graphite, fullerene, carbon fiber, graphitic carbon, carbon nanotube, or a combination thereof, and
   wherein an amount of the carbonaceous material is about 0.001 to about 99.999 parts by weight, based on 100 parts by weight of the carbon composite.

35. A lithium battery comprising the electrode of claim 33.

36. A device comprising the porous silicon composite cluster structure of claim 1 or comprising a carbon composite which comprises the porous silicon composite cluster structure of claim 1 and a carbonaceous material.

37. A device comprising the porous silicon composite cluster structure of claim 21 or comprising a carbon composite which comprises the porous silicon composite cluster structure of claim 21 and a carbonaceous material.

38. A device comprising the porous silicon composite cluster structure of claim 27 or comprising a carbon composite which comprises the porous silicon composite cluster structure of claim 27 and a carbonaceous material.

39. A method of preparing the porous silicon composite cluster structure of claim 1, the method comprising:
- contacting a dispersing agent, a solvent, and a particle comprising silicon and a silicon suboxide of the formula $SiO_x$ wherein $0<x<2$, coated on the silicon, to obtain a porous silicon cluster;
- thermally treating a combination of a carbon source gas and the porous silicon cluster to obtain the porous silicon secondary particle; and
- mixing a composition comprising the porous silicon secondary particle, amorphous carbon, and a solvent in a dry manner to prepare the porous silicon composite.

40. A method of preparing the porous silicon composite cluster structure of claim 21, the method comprising:
- contacting a dispersing agent, a solvent, and a particle comprising silicon and a silicon suboxide of the formula $SiO_x$ wherein $0<x<2$, coated on the silicon, to obtain a porous silicon cluster;
- thermally treating a combination of a carbon source gas and the porous silicon cluster to obtain the porous silicon secondary particle; and
- mixing a composition comprising the porous silicon secondary particle, amorphous carbon, and a solvent in a dry manner to prepare the porous silicon composite.

41. A method of preparing the porous silicon composite cluster structure of claim 27, the method comprising:
- contacting a dispersing agent, a solvent, and a particle comprising silicon and a silicon suboxide of the formula $SiO_x$ wherein $0<x<2$, coated on the silicon, to obtain a porous silicon cluster;
- thermally treating a combination of a carbon source gas and the porous silicon cluster to obtain the porous silicon secondary particle; and
- mixing a composition comprising the porous silicon secondary particle, amorphous carbon, and a solvent in a dry manner to prepare the porous silicon composite.

42. A porous silicon composite cluster structure comprising:
- a porous silicon composite cluster comprising
- a core comprising a porous silicon composite secondary particle, and
- a shell disposed on the core, the shell comprising a second carbon flake; and
- a carbonaceous layer on the porous silicon composite cluster, the carbonaceous layer comprising amorphous carbon,
- wherein the porous silicon composite secondary particle comprises an aggregate of silicon composite primary particles, and each of the silicon composite primary particles in the aggregate comprises:
- at least one silicon oxide selected from i) a silicon suboxide (SiOx, wherein $0<x<2$), and ii) a thermal treatment product of a silicon suboxide (SiOx, wherein $0<x<2$); and
- a first carbon flake disposed on the at least one silicon suboxide,
- wherein the silicon suboxide is in a form of a film, a matrix, or a combination thereof, and the first carbon flake and the second carbon flake are each independently present in a form of a film, particles, a matrix, or a combination thereof,
- wherein the thermal treatment product is a product of thermally treating the silicon suboxide in an atmosphere of a carbon source gas or a gas mixture comprising a carbon source gas and a reducing gas, and the thermal treatment product of the silicon suboxide comprises a silicon oxide of the formula SiOy, wherein $0<y\leq2$, and silicon disposed in the silicon oxide, or
- the thermal treatment product comprises a structure comprising a silicon oxide of the formula SiO2, a silicon suboxide of the formula SiOy wherein $0<y<2$, or a combination thereof, and silicon disposed in the structure,
- wherein the first carbon flake is a first graphene flake, and
- wherein the first graphene flake is
  - separated from the silicon suboxide by a distance of about 10 nanometers or less,
  - comprises 1 to about 30 graphene layers having a total thickness of about 0.3 nanometers to about 1,000 nanometers.

43. The porous silicon composite cluster structure of claim 42,
- wherein the first graphene flake is oriented at an angle of about 0° to about 90° with respect to a major axis of the silicon suboxide.

* * * * *